United States Patent
Nishita

(10) Patent No.: US 11,460,297 B2
(45) Date of Patent: Oct. 4, 2022

(54) MEASUREMENT APPARATUS AND CONTROL METHOD OF MEASUREMENT APPARATUS

(71) Applicant: TOPCON CORPORATION, Tokyo (JP)

(72) Inventor: Nobuyuki Nishita, Tokyo (JP)

(73) Assignee: TOPCON CORPORATION, Tokyo (JP)

( * ) Notice: Subject to any disclaimer, the term of this patent is extended or adjusted under 35 U.S.C. 154(b) by 589 days.

(21) Appl. No.: 16/574,909

(22) Filed: Sep. 18, 2019

(65) Prior Publication Data
US 2020/0096333 A1    Mar. 26, 2020

(30) Foreign Application Priority Data

Sep. 21, 2018  (JP) .............................. JP2018-177406
Aug. 19, 2019  (JP) .............................. JP2019-149697

(51) Int. Cl.
| | | |
|---|---|---|
| G01C 3/00 | (2006.01) | |
| G01C 3/08 | (2006.01) | |
| G01S 17/42 | (2006.01) | |
| G01S 17/89 | (2020.01) | |
| G01S 7/481 | (2006.01) | |
| G01S 7/497 | (2006.01) | |

(52) U.S. Cl.
CPC ................ *G01C 3/08* (2013.01); *G01S 17/42* (2013.01); *G01S 17/89* (2013.01); *G01S 7/4817* (2013.01); *G01S 7/497* (2013.01)

(58) Field of Classification Search
CPC .. G01C 3/00; G01C 15/00; G01S 7/00; G01S 17/00
See application file for complete search history.

(56) References Cited

U.S. PATENT DOCUMENTS

| | | | | |
|---|---|---|---|---|
| 2018/0106615 | A1* | 4/2018 | Ohtomo | .................. G01S 17/42 |
| 2020/0149875 | A1* | 5/2020 | Yamane | ............. G01B 11/2522 |

FOREIGN PATENT DOCUMENTS

JP    2018066571 A    4/2018

* cited by examiner

*Primary Examiner* — Maryam A Nasri
(74) *Attorney, Agent, or Firm* — Chiesa Shahinian & Giantomasi PC

(57) ABSTRACT

A measurement apparatus is provided that includes a distance measuring unit, a deflecting unit, and a calculation control unit which controls the distance measuring unit and the deflecting unit. The calculation control unit detects coordinates of a pair of intersection points of the object to be measured and a scan trajectory with the measurement light on the basis of a distance measurement result by the distance measuring unit and the direction of emission deflected by the deflecting unit. The calculation control unit controls a deflection operation of the deflecting unit so as to change the direction of emission on the basis of the coordinates of the pair of intersection points such that the scan trajectory with the measurement light and the object to be measured intersect with each other.

9 Claims, 16 Drawing Sheets

MEASUREMENT APPARATUS AND CONTROL METHOD OF MEASUREMENT APPARATUS

CROSS REFERENCE TO RELATED APPLICATIONS

This application is based upon and claims benefit of priority from Japanese Patent Application No. 2018-177406, filed Sep. 21, 2018, and Japanese Patent Application No. 2019-149697, filed Aug. 19, 2019, the entire contents of both are incorporated herein by reference.

BACKGROUND

The present invention relates to a measurement apparatus and a control method of the measurement apparatus.

In recent years, laser scanners that acquire point group data are being used as laser scanners for performing distance measurement and geometry measurement in the fields of civil engineering, construction, and the like. With conventional laser scanners, a range of a scan area is set in advance and scan conditions (for example, a scan speed and a light emission frequency) are temporarily set, in which case the entire scan area is scanned under the set scan conditions.

With such a conventional laser scanner, in order to increase scan density (the number of pieces of measurement point data per unit area) of any measured portion, scan density of an entire scan area must be increased to acquire an enormous amount of scan data. In consideration thereof, in Japanese Patent Application Publication No. 2018-066571, scan data is acquired in an efficient manner by setting a portion that requires high scan density as a localized measurement range and scanning the localized measurement range at high scan density.

SUMMARY

In the laser scanner disclosed in Japanese Patent Application Publication No. 2018-066571, a localized measurement range is a portion visually determined by a worker or a portion for which a large number of edges are extracted from image data acquired by an imaging unit. However, when a worker visually sets a localized measurement range, a setting operation to be performed by the worker is both complicated and significantly time-consuming. In addition, when setting a localized measurement range by extracting edges from image data, not only does processing of the image data require both time and processing load but it is impossible to efficiently measure only an object of which measurement is desired. In particular, when the object to be measured is an electric wire or the like formed in at least any of a linear shape, a rod shape, and a columnar shape, the entire object to be measured cannot be measured in a simple and efficient manner.

The present invention has been made in order to solve the problems described above, and an object of the present invention is to provide a measurement apparatus capable of readily and efficiently measuring an entire object to be measured that is formed in at least any of a linear shape, a rod shape, and a columnar shape and a control method of the measurement apparatus.

According to the present invention, the problems described above can be solved by a measurement apparatus including: a distance measuring unit having a light producing element which produces measurement light, a measurement light emitting unit which emits the measurement light, a light receiving unit which receives reflected measurement light, and a light receiving element which receives the reflected measurement light and generates a light reception signal, the distance measuring unit performing a distance measurement of an object to be measured on the basis of a light reception signal from the light receiving element; a deflecting unit which deflects a direction of emission of the measurement light relative to a reference optical axis and which is capable of performing a scan relative to a prescribed center in a circumferential direction with the measurement light; and a control unit which controls the distance measuring unit and the deflecting unit, wherein the control unit detects coordinates of a pair of intersection points of the object to be measured that is formed in at least any of a linear shape, a rod shape, and a columnar shape and a scan trajectory with the measurement light on the basis of a distance measurement result by the distance measuring unit and the direction of emission deflected by the deflecting unit, and controls a deflection operation of the deflecting unit so as to change the direction of emission on the basis of the coordinates of the pair of intersection points so that the scan trajectory with the measurement light and the object to be measured intersect with each other.

According to the measurement apparatus with the present configuration, coordinates of a pair of intersection points of an object to be measured that is formed in at least any of a linear shape, a rod shape, and a columnar shape (hereinafter, may be referred to as a "linear shape or the like" for convenience of description) and a scan trajectory with measurement light are detected on the basis of a distance measurement result by the distance measuring unit and a direction of emission deflected by the deflecting unit. The detection of a pair of intersection points indicates a state where measurement light for performing a scan in a circumferential direction is measuring the object to be measured with a linear shape or the like. In addition, in the state where the object to be measured with a linear shape or the like is being measured, the direction of emission of the measurement light is changed so that a scan trajectory with the measurement light and the object to be measured with a linear shape or the like intersect each other. Therefore, even after the direction of emission of the measurement light is changed, a state where the object to be measured that is formed in a linear shape or the like is being measured is maintained. By repetitively changing the direction of emission of the measurement light in this manner, an entirety of the object to be measured formed in a linear shape can be measured in a simple and efficient manner.

In the measurement apparatus according to the present invention, preferably, the control unit changes the direction of emission so that a center of the coordinates of the pair of intersection points continuously moves either leftward or rightward in a horizontal direction.

According to the measurement apparatus with the present configuration, an area from one end to another end of the object to be measured formed in a linear shape or the like can be continuously measured either leftward or rightward in a horizontal direction.

In the measurement apparatus according to the present invention, preferably, the control unit changes the direction of emission so that the prescribed center is arranged on an extension of the coordinates of the pair of intersection points.

According to the measurement apparatus with the present configuration, since a center of the scan trajectory with the measurement light is arranged on an extension of the coordinates of the pair of intersection points, when the object to be measured formed in a linear shape or the like extends approximately linearly, the object to be measured can be reliably measured even after changing the direction of emission of the measurement light.

In the measurement apparatus according to the present invention, preferably, the control unit changes the direction of emission so that a scan trajectory with the measurement light prior to changing the direction of emission and a scan trajectory with the measurement light after changing the direction of emission overlap with each other.

According to the measurement apparatus with the present configuration, since the scan trajectory with the measurement light prior to changing the direction of emission and the scan trajectory with the measurement light after changing the direction of emission overlap with each other, the object to be measured formed in a linear shape or the like can be reliably acquired and measured at high density.

In the measurement apparatus according to the present invention, preferably, the control unit changes the direction of emission so that the prescribed center is arranged at either one of the pair of intersection points.

According to the measurement apparatus with the present configuration, since a center of the scan trajectory with the measurement light is arranged at either one of the coordinates of the pair of intersection points, even when the object to be measured formed in a linear shape or the like extends in a curved shape or the direction in which the object to be measured extends changes, the object to be measured can be reliably measured after changing the direction of emission.

In the measurement apparatus according to the present invention, preferably, the control unit estimates a range of coordinates of the pair of intersection points detected after changing the direction of emission on the basis of the coordinates of the pair of intersection points, and detects coordinates included in the estimated range as the coordinates of the pair of intersection points.

According to the measurement apparatus with the present configuration, a range of coordinates of a pair of intersection points detected after changing the direction of emission of the measurement light is estimated and coordinates included in the estimated range are detected as coordinates of the pair of intersection points. Therefore, even when another object to be measured (an electric wire in the background or the like) is present behind the object to be measured, coordinates of the other object to be measured which are not included in the estimated coordinate range can be eliminated and errors in measurement can be suppressed.

In the measurement apparatus according to the present invention, preferably, the control unit changes the direction of emission so that a scan trajectory with the measurement light has a circular shape and the circular shape has a size in accordance with a thickness of the object to be measured at a position where the object to be measured is arranged.

According to the measurement apparatus with the present configuration, since a size of a circular scan trajectory at a position where the object to be measured is arranged is a size in accordance with the thickness of the object to be measured, the object to be measured can be measured at desired density regardless of a distance from the measurement apparatus to the object to be measured.

In the measurement apparatus according to the present invention, preferably, the control unit changes the direction of emission so that a scan trajectory with the measurement light has an elliptical shape with a minor axis in a direction connecting the pair of intersection points and the minor axis has a length in accordance with an inclination angle formed between a straight line connecting the pair of intersection points and the measurement light.

According to the measurement apparatus with the present configuration, even when the object to be measured is arranged such that a direction in which the object to be measured extends and the measurement light form an inclination angle that is an obtuse angle larger than 90 degrees, since a length connecting the pair of intersection points is maintained at a constant length, coordinates of each part of the object to be measured that is formed in a linear shape or the like can be acquired at constant intervals.

According to the present invention, the problems described above can be solved by a control method of a measurement apparatus which performs a distance measurement of an object to be measured, the measurement apparatus including: a distance measuring unit having a light producing element which produces measurement light, a measurement light emitting unit which emits the measurement light, a light receiving unit which receives reflected measurement light, and a light receiving element which receives the reflected measurement light and generates a light reception signal; and a deflecting unit which deflects a direction of emission of the measurement light relative to a reference optical axis and which is capable of performing a scan relative to a prescribed center in a circumferential direction with the measurement light, the control method including the steps of: performing a distance measurement of the object to be measured on the basis of a light reception signal from the light receiving element; detecting coordinates of a pair of intersection points of the object to be measured that is formed in at least any of a linear shape, a rod shape, and a columnar shape and a scan trajectory with the measurement light on the basis of a distance measurement result of the step of performing a distance measurement and the direction of emission deflected by the deflecting unit; and controlling a deflection operation of the deflecting unit so as to change the direction of emission on the basis of the coordinates of the pair of intersection points so that the scan trajectory with the measurement light and the object to be measured intersect with each other.

According to the control method of a measurement apparatus with the present configuration, coordinates of a pair of intersection points of an object to be measured that is formed in a linear shape or the like and a scan trajectory with measurement light are detected on the basis of a distance measurement result of the step of performing a distance measurement and a direction of emission deflected by the deflecting unit. The detection of a pair of intersection points indicates a state where measurement light for performing a scan in a circumferential direction is measuring the object to be measured with a linear shape or the like. In addition, in the state where the object to be measured with a linear shape or the like is being measured, the direction of emission of the measurement light is changed so that a scan trajectory with the measurement light and the object to be measured with a linear shape or the like intersect each other. Therefore, even after the direction of emission of the measurement light is changed, a state where the object to be measured that is formed in a linear shape or the like is being measured is maintained. By repetitively changing the direction of emission of the measurement light in this manner, an entirety of the object to be measured formed in a linear shape or the like can be measured in a simple and efficient manner.

According to the present invention, a measurement apparatus capable of readily and efficiently measuring an entire object to be measured that is formed in at least any of a linear

DETAILED DESCRIPTION

First Embodiment

Figure 1:
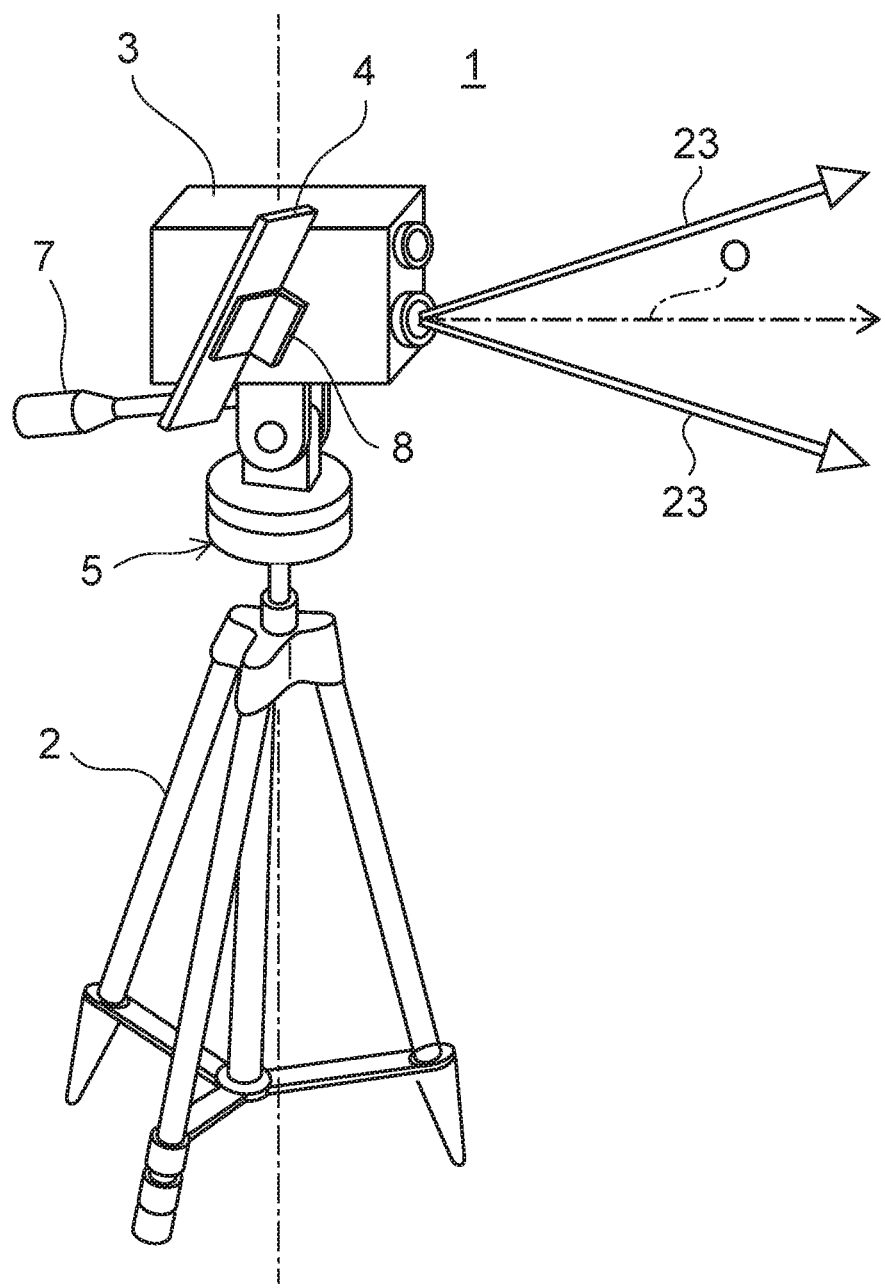
FIG. 1 is an external view of a measurement system equipped with a laser scanner according to a first embodiment of the present invention.

Hereinafter, embodiments of the present invention will be described with reference to the drawings. First, an outline of a measurement system (a measurement apparatus) equipped with a laser scanner according to the present embodiment will be provided with reference to FIG. 1. In FIG. 1, reference numeral 1 denotes a measurement system and reference character O denotes an optical axis in a state where the optical axis is not deflected by a deflecting unit 35 (to be described later), whereby the optical axis as this point will be used as a reference optical axis.

The measurement system 1 is mainly constituted by a tripod 2 as a supporting apparatus, a laser scanner 3, an operating apparatus 4, and a turntable 5. The turntable 5 is mounted to a top end of the tripod 2, and the laser scanner 3 is mounted to the turntable 5 so as to be laterally rotatable and vertically rotatable. In addition, the turntable 5 is equipped with a function of detecting an angle of rotation in a lateral direction (an angle of rotation in a horizontal direction) of the laser scanner 3.

The turntable 5 is provided with a lever 7 that extends in the lateral direction. By operating the lever 7, the laser scanner 3 can be rotated in an up-down direction (the vertical angle) or in the lateral direction (the horizontal direction) and can also be fixed at a necessary attitude.

The laser scanner 3 has a built-in distance measuring unit 3A (refer to FIG. 2) and a built-in attitude detecting unit 17 (refer to FIG. 2), and the distance measuring unit 3A performs a measurement by emitting measurement light 23 to an object to be measured or a measurement range and receiving reflected measurement light 24. In addition, the attitude detecting unit 17 is capable of detecting an attitude of the laser scanner 3 in relation to vertical (or horizontal) with high accuracy.

The operating apparatus 4 has a communication function for communicating with the laser scanner 3 via necessary means such as wired or wireless means. In addition, the operating apparatus 4 is attachable to and detachable from the laser scanner 3 via an attachment 8, the detached operating apparatus 4 can be held and operated by one hand, and the laser scanner 3 can be remotely operated using the operating apparatus 4.

Furthermore, images, a measurement state, a measurement result, and the like are to be transmitted from the laser scanner 3 to the operating apparatus 4 to be stored in the operating apparatus 4 and displayed on a display unit (not shown) of the operating apparatus 4. For example, the operating apparatus 4 may be a smartphone.

Figure 2:
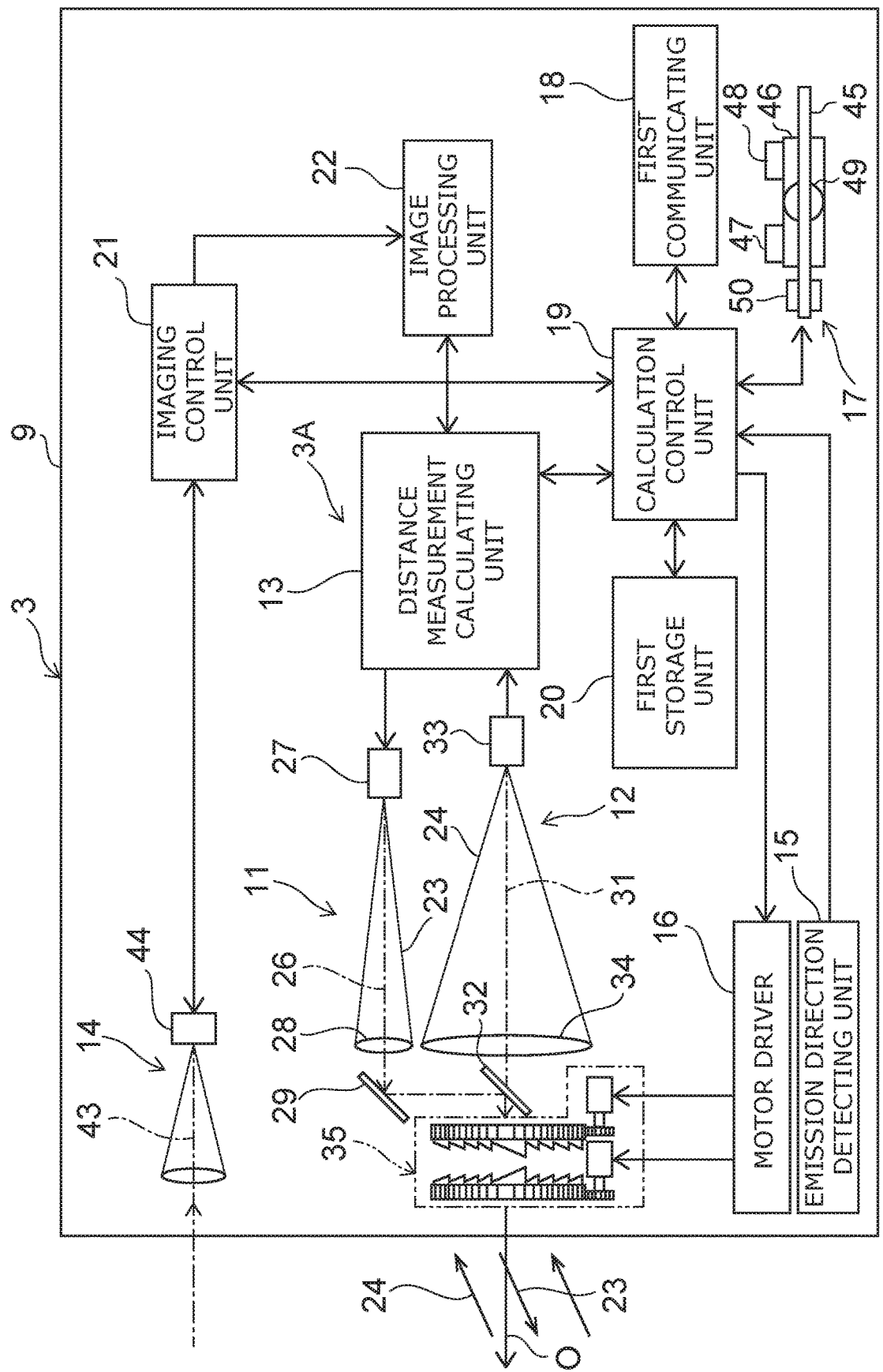
FIG. 2 is a schematic configuration diagram of the laser scanner shown in FIG. 1.

The laser scanner 3 will be described with reference to FIG. 2.

The laser scanner 3 is equipped with a measurement light emitting unit 11, a light receiving unit 12, a distance measurement calculating unit 13, an imaging unit 14, an emission direction detecting unit 15, a motor driver 16, the attitude detecting unit 17, a first communicating unit 18, a calculation control unit 19, a first storage unit 20, an imaging control unit 21, and an image processing unit 22, and the units are housed in an enclosure 9 and integrated with each other. It should be noted that the measurement light emitting unit 11, the light receiving unit 12, the distance measurement calculating unit 13, and the like constitute the distance measuring unit 3A.

The measurement light emitting unit 11 has an emission optical axis 26, and a light producing element 27 such as a laser diode (LD) is provided on the emission optical axis 26. In addition, a projection lens 28 is provided on the emission optical axis 26. Furthermore, a first reflecting mirror 29 as a deflecting optical member provided on the emission optical axis 26 and a second reflecting mirror 32 as a deflecting optical member provided on a reception optical axis 31 (to be described later) deflect the emission optical axis 26 so as to match the reception optical axis 31. The first reflecting mirror 29 and the second reflecting mirror 32 constitute an emission optical axis deflecting unit. The light producing element 27 produces a pulse laser beam, and the measurement light emitting unit 11 emits the pulse laser beam produced by the light producing element 27 as the measurement light 23.

The light receiving unit 12 will be described. Reflected measurement light 24 from an object to be measured (in other words, a measurement point) is incident to the light receiving unit 12. The light receiving unit 12 has the reception optical axis 31 and, as described above, the emission optical axis 26 having been deflected by the first reflecting mirror 29 and the second reflecting mirror 32 matches the reception optical axis 31.

The deflecting unit 35 (to be described later) is arranged on the deflected emission optical axis 26 or, in other words, on the reception optical axis 31. A straight optical axis that passes through a center of the deflecting unit 35 constitutes the reference optical axis O. The reference optical axis O matches the emission optical axis 26 when not deflected by the deflecting unit 35 or the reception optical axis 31.

An imaging lens 34 and a light receiving element 33 such as a photodiode (PD) is arranged and provided on the incident reception optical axis 31 having passed through the deflecting unit 35. The imaging lens 34 focuses the reflected measurement light 24 on the light receiving element 33. The light receiving element 33 receives the reflected measurement light 24 and generates a light reception signal. The light reception signal is input to the distance measurement calculating unit 13. The distance measurement calculating unit 13 performs a distance measurement up to a measurement point on the basis of the light reception signal.

Figure 3:
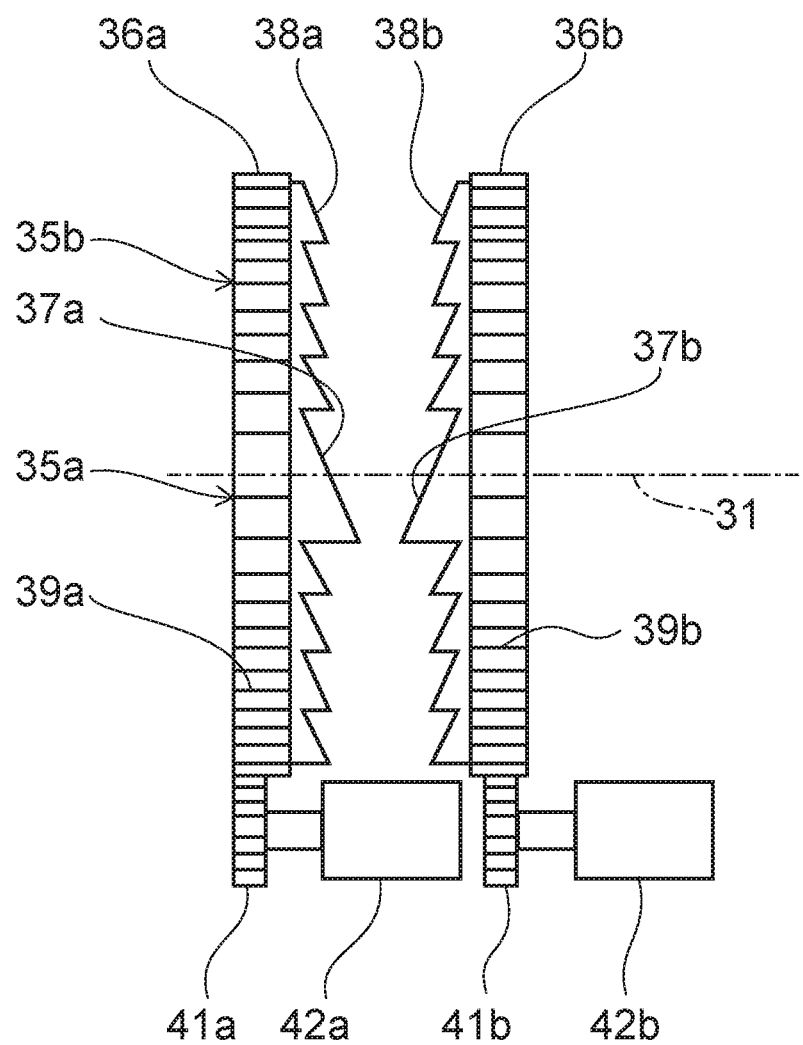
FIG. 3 is a schematic view of a deflecting unit in the laser scanner shown in FIG. 1.

The deflecting unit 35 will be described with reference to FIG. 3. The deflecting unit 35 is constituted by a pair of optical prisms 36a and 36b. The optical prisms 36a and 36b respectively have a disk shape and are orthogonally arranged on the reception optical axis 31 so as to overlap with, and in parallel to, each other. Using a Risley prism as each of the optical prisms 36a and 36b is preferable in terms of downsizing the apparatus. A center part of the deflecting unit 35 constitutes a measurement light deflecting unit 35a which is a first deflecting unit that transmits and emits the measurement light 23, and a portion excluding the center part constitutes a reflected measurement light deflecting unit 35b which is a second deflecting unit that transmits and emits the reflected measurement light 24.

The Risley prisms used as the optical prisms 36a and 36b are respectively constituted by prism elements 37a and 37b formed in parallel and a large number of prism elements 38a and 38b, and have a disk shape. The optical prisms 36a and 36b and the respective prism elements 37a, 37b and 38a, 38b have same optical characteristics.

The prism elements 37a and 37b constitute the measurement light deflecting unit 35a while the prism elements 38a and 38b constitute the reflected measurement light deflecting unit 35b. The Risley prisms may be manufactured of optical glass or molded from an optical plastic material. Molding the Risley prisms from an optical plastic material enables the Risley prisms to be inexpensively manufactured.

The optical prisms 36a and 36b are each arranged so as to be independently and individually rotatable around the reception optical axis 31. By independently controlling a rotational direction, an amount of rotation, and a rotational speed of the optical prisms 36a and 36b, the measurement light 23 passing through the emission optical axis 26 is deflected in an arbitrary direction and the received reflected measurement light 24 is deflected so as to be parallel to the reception optical axis 31. An external shape of each of the optical prisms 36a and 36b is a circular shape centered on the reception optical axis 31, and diameters of the optical prisms 36a and 36b are set so as to enable a sufficient amount of light to be acquired in consideration of the spread of the reflected measurement light 24.

A ring gear 39a is fitted to an outer circumference of the optical prism 36a, and a ring gear 39b is fitted to an outer circumference of the optical prism 36b. A drive gear 41a meshes with the ring gear 39a, and the drive gear 41a is fastened to an output shaft of a motor 42a. In a similar manner, a drive gear 41b meshes with the ring gear 39b, and the drive gear 41b is fastened to an output shaft of a motor 42b. The motors 42a and 42b are electrically connected to the motor driver 16.

As the motors 42a and 42b, a motor capable of detecting an angle of rotation or a motor that produces rotation corresponding to a drive input value such as a pulse motor is used. Alternatively, an amount of rotation of the motor may be detected using an angle of rotation detector that detects an amount of rotation (an angle of rotation) of the motor such as an encoder. Amounts of rotation of the motors 42a and 42b are respectively detected and the motors 42a and 42b are individually controlled by the motor driver 16. Alternatively, a configuration may be adopted in which encoders are respectively directly mounted to the ring gears 39a and 39b and the angles of rotation of the ring gears 39a and 39b are directly detected by the encoders.

The drive gears 41a and 41b and the motors 42a and 42b are provided at positions where interference with the measurement light emitting unit 11 is prevented such as below the ring gears 39a and 39b.

The projection lens 28, the first reflecting mirror 29, the second reflecting mirror 32, the measurement light deflecting unit 35a, and the like constitute a projection optical system, and the reflected measurement light deflecting unit 35b, the imaging lens 34, and the like constitute a reception optical system.

The distance measurement calculating unit 13 controls the light producing element 27 and causes the light producing element 27 to produce a pulse laser beam as the measurement light 23. The measurement light 23 is deflected by the prism elements 37a and 37b (the measurement light deflecting unit 35a) so as to be directed toward a measurement point.

The reflected measurement light 24 reflected from the object to be measured is incident to and received by the light receiving element 33 via the prism elements 38a and 38b (the reflected measurement light deflecting unit 35b) and the imaging lens 34. The light receiving element 33 sends a light reception signal to the distance measurement calculating unit 13, and on the basis of the light reception signal from the light receiving element 33, the distance measurement calculating unit 13 performs a distance measurement of a measurement point (a point irradiated by the measurement light 23) for each pulse beam and stores distance measurement data in the first storage unit 20. In this manner, distance measurement data of each measurement point can be acquired by performing a distance measurement for each pulse beam while performing a scan with the measurement light 23.

The emission direction detecting unit 15 detects angles of rotation of the motors 42a and 42b by counting drive pulses input to the motors 42a and 42b. Alternatively, the emission direction detecting unit 15 detects the angles of rotation of the motors 42a and 42b on the basis of signals from encoders. In addition, the emission direction detecting unit 15 calculates rotational positions of the optical prisms 36a and 36b on the basis of the angles of rotation of the motors 42a and 42b.

Furthermore, the emission direction detecting unit 15 calculates a direction of emission of the measurement light 23 on the basis of refractive indexes and rotational positions of the optical prisms 36a and 36b and inputs a calculation result to the calculation control unit 19. The calculation control unit 19 can obtain three-dimensional data of the measurement point by calculating a horizontal angle θ1 and a vertical angle θ2 of the measurement point relative to the reference optical axis O from the direction of emission of the measurement light 23 and associating the horizontal angle θ1 and the vertical angle θ2 with the distance measurement data for each measurement point.

The attitude detecting unit 17 will be described. The attitude detecting unit 17 has a frame 45, and the frame 45 is fixed to the enclosure 9 or to a structural member and integrated with the laser scanner 3. A sensor block 46 is mounted to the frame 45 via gimbals. The sensor block 46 is configured so as to be rotatable by 360 degrees around two orthogonal axes. A first inclination sensor 47 and a second inclination sensor 48 are mounted to the sensor block 46.

The first inclination sensor 47 detects horizontal at high accuracy and is constituted by, for example, an inclination detector that detects horizontal on the basis of a variation in a reflection angle of reflected light of detection light incident to a horizontal liquid surface or a bubble tube that detects an inclination on the basis of a positional variation of a bubble encapsulated therein. In addition, the second inclination sensor 48 detects an inclination variation with high responsiveness and is, for example, an acceleration sensor.

Relative angles of rotation around the two axes of the sensor block 46 relative to the frame 45 are detected by encoders 49 and 50. In addition, a motor (not shown) that rotates the sensor block 46 to keep the sensor block 46 horizontal is provided for the two axes, and the motor is controlled by the calculation control unit 19 on the basis of detection results from the first inclination sensor 47 and the second inclination sensor 48 so as to keep the sensor block 46 horizontal.

When the sensor block 46 is inclined (when the laser scanner 3 is inclined), a relative angle of rotation relative to the sensor block 46 is detected by the encoders 49 and 50 and, on the basis of the detection results of the encoders 49 and 50, an inclination angle and an inclination direction of the laser scanner 3 are detected. Since the sensor block 46 is rotatable by 360 degrees around the two axes, regardless of what kind of attitude is assumed by the attitude detecting unit 17 (for example, even when top and bottom of the attitude detecting unit 17 are reversed), attitude detection can be performed in all directions.

Although attitude detection and attitude control are performed on the basis of a detection result of the second inclination sensor 48 when high responsiveness is required in the attitude detection, generally, detection accuracy of the second inclination sensor 48 is lower than that of the first inclination sensor 47. With the attitude detecting unit 17 equipped with the high-accuracy first inclination sensor 47 and the highly-responsive second inclination sensor 48, attitude control is performed on the basis of a detection result of the second inclination sensor 48 while the first inclination sensor 47 enables attitude detection with high accuracy.

A detection result of the second inclination sensor 48 can be calibrated by a detection result of the first inclination sensor 47. Specifically, when a deviation occurs between values of the encoders 49 and 50 when the first inclination sensor 47 detects horizontal or, in other words, an actual inclination angle and an inclination angle detected by the second inclination sensor 48, the inclination angle of the second inclination sensor 48 can be calibrated on the basis of the deviation.

Therefore, by acquiring, in advance, a relationship between a detected inclination angle of the second inclination sensor 48 and an inclination angle obtained on the basis of horizontal detection by the first inclination sensor 47 and detection results of the encoders 49 and 50, the inclination angle detected by the second inclination sensor 48 can be calibrated and accuracy of attitude detection with high responsiveness by the second inclination sensor 48 can be improved.

When a variation in inclination is large or rapid, the calculation control unit 19 controls the motor on the basis of a signal from the second inclination sensor 48. On the other hand, when a variation in inclination is small or gradual or, in other words, when the variation in inclination can be tracked by the first inclination sensor 47, the calculation control unit 19 controls the motor on the basis of a signal from the first inclination sensor 47.

The first storage unit 20 stores contrast data indicating a result of a comparison between a detection result of the first inclination sensor 47 and a detection result of the second inclination sensor 48. The detection result by the second inclination sensor 48 is calibrated on the basis of a signal from the second inclination sensor 48. Due to the calibration, a detection accuracy of the detection result of the second inclination sensor 48 can be raised to a detection accuracy of the first inclination sensor 47. Therefore, in attitude detection by the attitude detecting unit 17, high responsiveness can be realized while maintaining high accuracy.

The imaging unit 14 is a camera having an imaging optical axis 43 which is parallel to the reference optical axis O of the laser scanner 3 and an angle of view of, for example, 50 degrees, and acquires image data including a scan range of the laser scanner 3. A relationship among the imaging optical axis 43, the emission optical axis 26, and the reference optical axis O is known. In addition, the imaging unit 14 is capable of acquiring moving images or continuous images.

The imaging control unit 21 controls imaging by the imaging unit 14. When the imaging unit 14 captures a moving image or a continuous image, the imaging control unit 21 synchronizes a timing of acquiring a frame image that constitutes the moving image or the continuous image and a timing of scanning with the laser scanner 3. The calculation control unit 19 also associates an image with point group data.

An imaging element 44 of the imaging unit 14 is a CCD or a CMOS sensor which is an aggregate of pixels, and a position of each pixel on an image element can be specified. For example, each pixel has pixel coordinates in a coordinate system of which an origin is the imaging optical axis 43, and the position of the pixel on an image element is specified by the pixel coordinates. The image processing unit 22 performs image processing for superimposing information to be displayed by the operating apparatus 4 on image data acquired by the imaging unit 14 and the like. An image generated by the image processing unit 22 is displayed on an operation screen 4A of the operating apparatus 4 by the calculation control unit 19.

A measurement operation by the laser scanner 3 will now be described. The tripod 2 is installed at a known point or a prescribed point and the reference optical axis O is directed toward an object to be measured. A horizontal angle of the reference optical axis O at this point is detected by the horizontal angle detection function of the turntable 5 and an inclination angle of the reference optical axis O relative to horizontal is detected by the attitude detecting unit 17.

Figure 4:
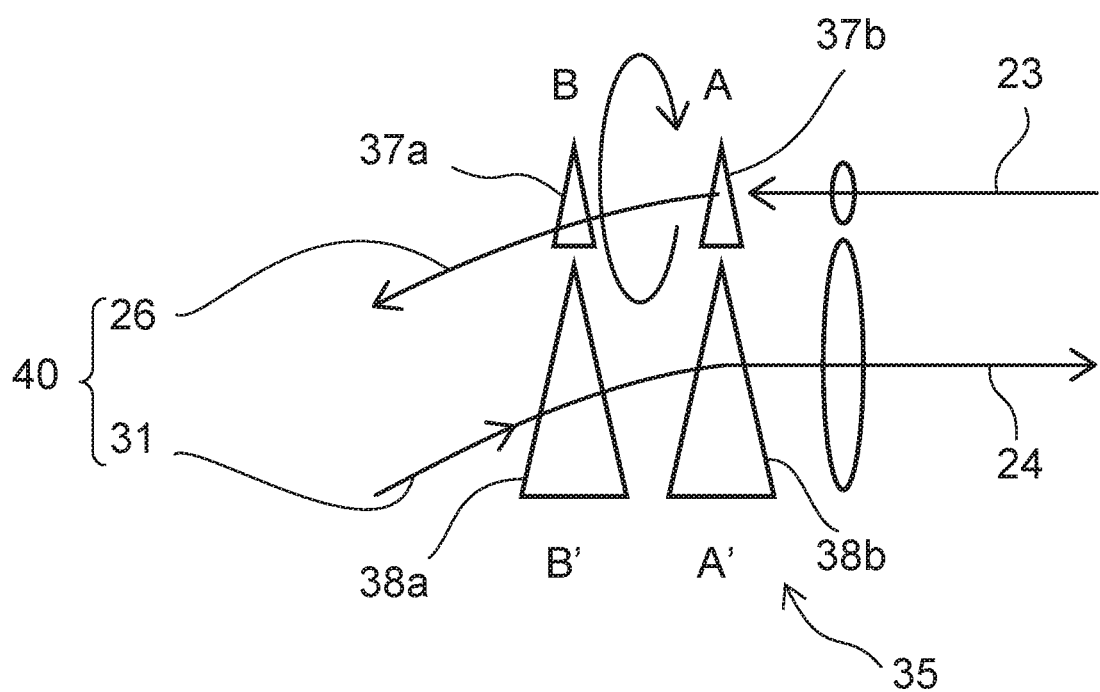
FIG. 4 is a diagram illustrating an action of the deflecting unit shown in FIG. 3.

A deflection operation and a scan operation of the deflecting unit 35 will be described with reference to FIG. 4. In FIG. 4, for the sake of brevity, the prism elements 37a and 37b and the prism elements 38a and 38b are shown separated from each other in the optical prisms 36a and 36b. In addition, FIG. 4 shows a state where the prism elements 37a and 37b and the prism elements 38a and 38b are positioned in a same direction, and a maximum angle of deflection is obtained in this state. On the other hand, a minimum angle of deflection is obtained at a position where either one of the optical prisms 36a and 36b has rotated by 180 degrees, in which case mutual optical actions of the optical prisms 36a and 36b cancel each other out to produce an angle of deflection of 0 degrees. Therefore, the measurement light 23 emitted via the optical prisms 36a and 36b and the reflected measurement light 24 received via the optical prisms 36a and 36b match the reference optical axis O.

The measurement light 23 is produced by the light producing element 27, made into a parallel luminous flux by the projection lens 28, passes through the measurement light deflecting unit 35a (the prism elements 37a and 37b), and emitted toward the object to be measured or a measurement range. By passing through the measurement light deflecting unit 35a, the measurement light 23 is deflected and emitted in a necessary direction by the prism elements 37a and 37b. The reflected measurement light 24 reflected by the object to be measured or the measurement range passes through and is incident to the reflected measurement light deflecting unit 35b and is focused on the light receiving element 33 by the imaging lens 34.

By passing through the reflected measurement light deflecting unit 35b, the reflected measurement light 24 is deflected by the prism elements 38a and 38b so as to match the reception optical axis 31 (FIG. 4). Due to a combination of rotational positions of the optical prism 36a and the optical prism 36b, a deflection direction and an angle of deflection of the measurement light 23 to be emitted can be arbitrarily changed.

Therefore, by controlling the deflecting unit 35 while producing a laser beam with the light producing element 27, the calculation control unit 19 can perform a scan with the measurement light 23 in a circular trajectory. It is needless to say that the reflected measurement light deflecting unit 35b integrally rotates with the measurement light deflecting unit 35a.

Furthermore, by executing distance measurement while performing scans with the measurement light 23 by continuously varying the angle of deflection of the deflecting unit 35, distance measurement data (scan data) can be acquired along a scan trajectory. In addition, with respect to scan conditions determined by a scan speed, a scan density, and the like, the scan speed is increased or reduced by increasing or reducing a rotational speed of the motors 42a and 42b while maintaining a relationship therebetween, and the scan density can be set to a prescribed value by controlling a relationship between the scan speed and a pulse emission period of the measurement light 23.

An angle of emission direction of the measurement light 23 during measurement can be detected from angles of rotation of the motors 42a and 42b, and three-dimensional distance measurement data can be acquired by associating the angle of emission direction during measurement with distance measurement data. Therefore, the laser scanner 3 can be made to function as a laser scanner that acquires point group data having three-dimensional position data.

Next, a process of acquiring point group data of an object to be measured by the measurement system 1 according to the present embodiment will be described. The object to be measured according to the present embodiment is an electric wire 100 formed so as to extend in a linear shape. It should be noted that the object to be measured according to the present embodiment is not limited to an object to be measured with a linear shape and may have a rod shape or a columnar shape. In addition, the object to be measured according to the present embodiment is not limited to an electric wire and need only be an object formed in at least any of a linear shape, a rod shape, and a columnar shape and, for example, the object to be measured may be an H-beam used as building material or the like, a pipe, a utility pole, a column of a building, or the like. Furthermore, the object to be measured according to the present embodiment is not limited to an object to be measured that extends in a linear shape and may be, for example, an object to be measured having a curved portion such as a pipe or an object to be measured that extends in a curved shape such as an electric wire suspended between utility poles. A width of the object to be measured is desirably equal to or less than one third of a length of the object to be measured. The measurement system 1 according to the present embodiment does not cause the first storage unit 20 to store measurement results of an entire field of view including the electric wire 100 but causes the first storage unit 20 to only store measurement results of a portion of the electric wire 100.

Figure 5:
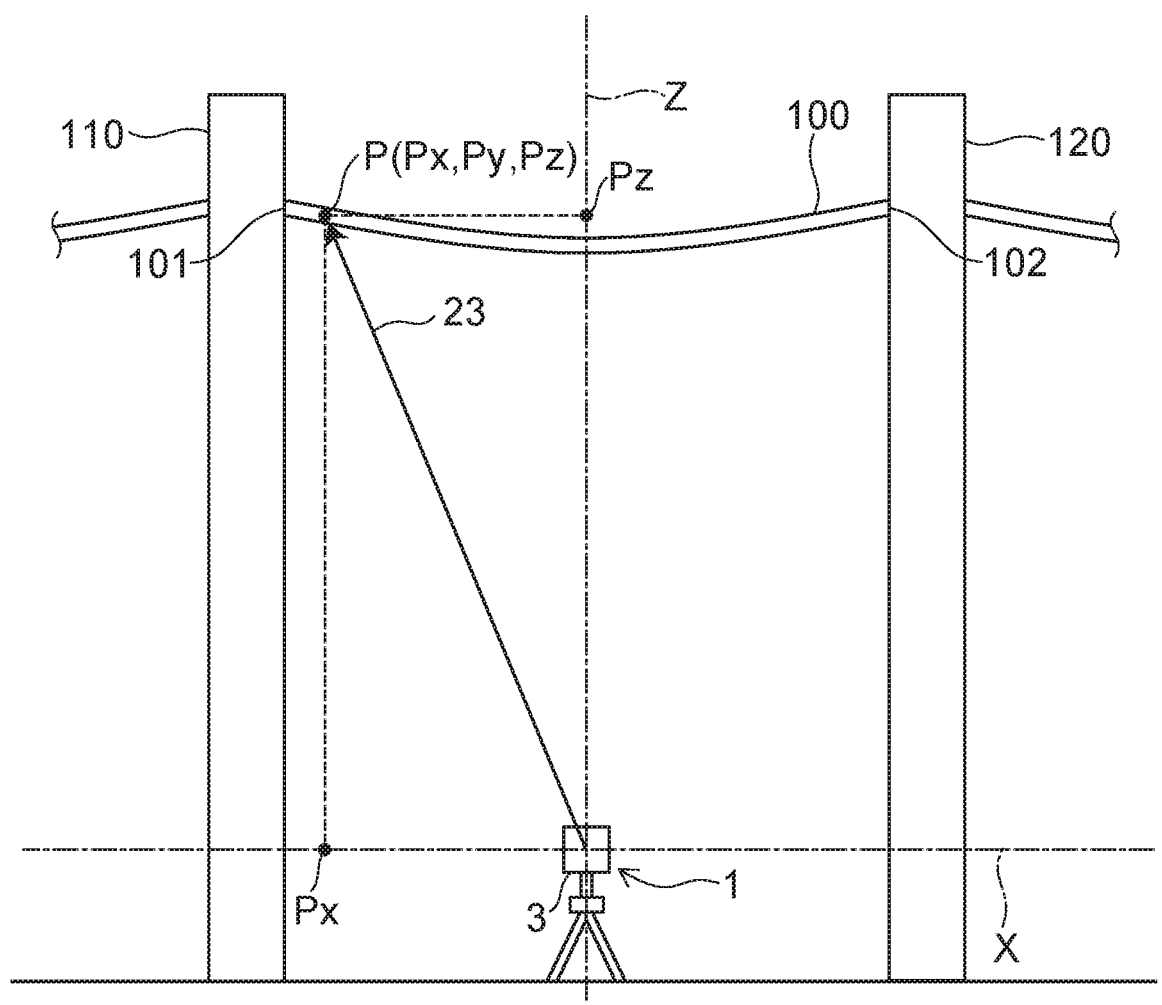
FIG. 5 is an X-Z plan view in which an electric wire is viewed in a horizontal direction along a reference optical axis.
Figure 6:
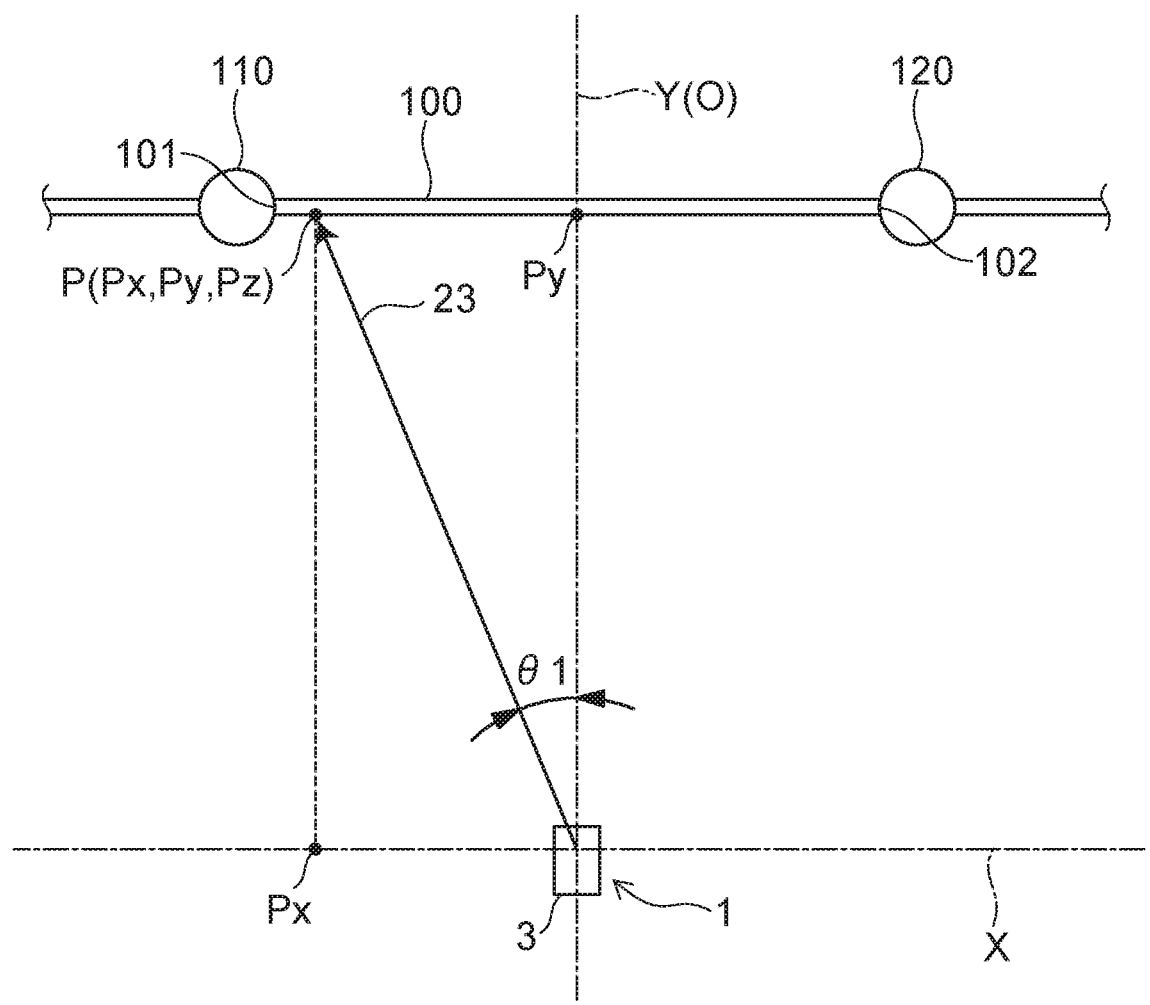
FIG. 6 is an X-Y plan view in which an electric wire and a measurement system are viewed from above.
Figure 7:
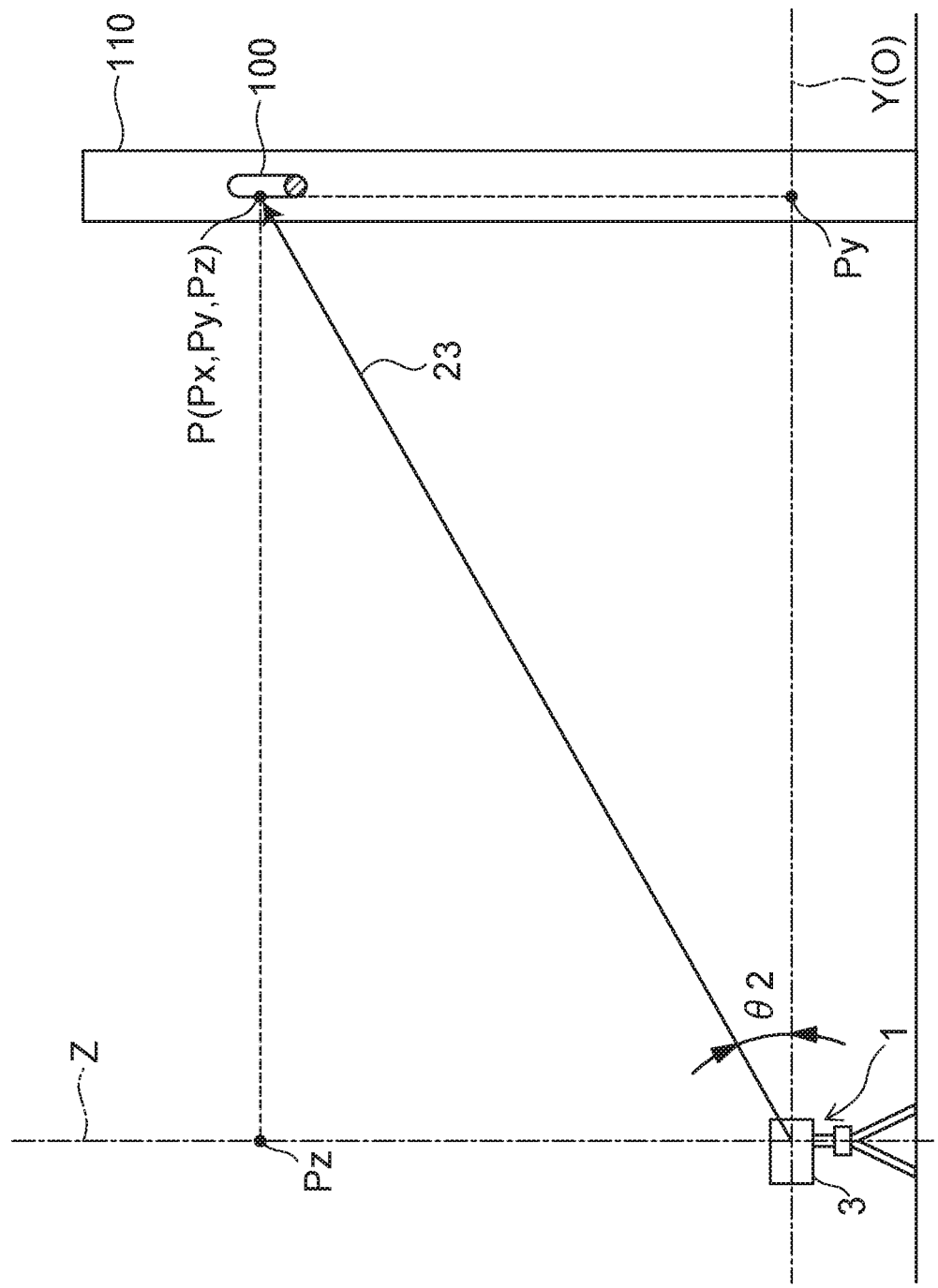
FIG. 7 is a Y-X plan view in which an electric wire and a measurement system are viewed from a horizontal direction.

FIG. 5 is an X-Z plan view in which the electric wire 100 is viewed along the reference optical axis O. FIG. 6 is an X-Y plan view in which the electric wire 100 and the measurement system 1 are viewed from above. FIG. 7 is a Y-X plan view in which the electric wire 100 and the measurement system 1 are viewed from the horizontal direction.

In FIGS. 5 to 7, an axis X, an axis Y, and an axis Z are axes that pass a reference point of measurement of the laser scanner 3 of the measurement system 1. The axis Y is an axis that matches the reference optical axis O of the laser scanner 3. The axes X and Z are axes orthogonal to each other at the reference point and respectively orthogonal to the axis Y. A position P (Px, Py, Pz) in a three-dimensional space defined by the axis X, the axis Y, and the axis Z represents coordinates with the laser scanner 3 as a reference.

As described earlier, a horizontal angle (an inclination angle relative to a horizontal plane) of the axis Y can be detected by the attitude detecting unit 17. Therefore, by correcting the position P (Px, Py, Pz) on the basis of the horizontal angle detected by the attitude detecting unit 17, the calculation control unit 19 can calculate a position with the horizontal plane as a reference.

In FIGS. 5 to 7, the measurement light 23 is deflected by the deflecting unit 35 so as to pass the position P (Px, Py, Pz) on the electric wire 100. Px denotes a coordinate of the position P on the axis X, Py denotes a coordinate of the position P on the axis Y, and Pz denotes a coordinate of the position P on the axis Z.

As shown in FIG. 5, of the electric wire 100 which is the object to be measured according to the present embodiment, one end 101 is attached to a utility pole 110, another end 102 is attached to a utility pole 120, and the electric wire 100 is formed in a linear shape. The pair of utility poles 110 and 120 are arranged at an interval in an axis X direction. For example, the electric wire 100 is attached to the utility pole 110 and the utility pole 120 so that heights of the one end 101 and the other end 102 in an axis Z direction are the same. Due to its own weight, a position in the vertical direction of the electric wire 100 along the axis Z is lowest in a center part in a length direction from the one end 101 to the other end 102.

As shown in FIG. 6, on an X-Y plane (a plane on which the axis X and the axis Y are arranged), an angle formed between the axis Y and the direction of emission of the measurement light 23 on the X-Y plane is a horizontal angle $\theta 1$. As shown in FIG. 7, on a Y-Z plane (a plane on which the axis Y and the axis Z are arranged), an angle formed between the axis Y and the measurement light 23 on the Y-Z plane is a vertical angle $\theta 2$. The emission direction detecting unit 15 calculates the horizontal angle $\theta 1$ and the vertical angle $\theta 2$ which indicate the direction of emission of the measurement light 23 on the basis of refractive indexes and rotational positions of the optical prisms 36a and 36b.

Figure 8:
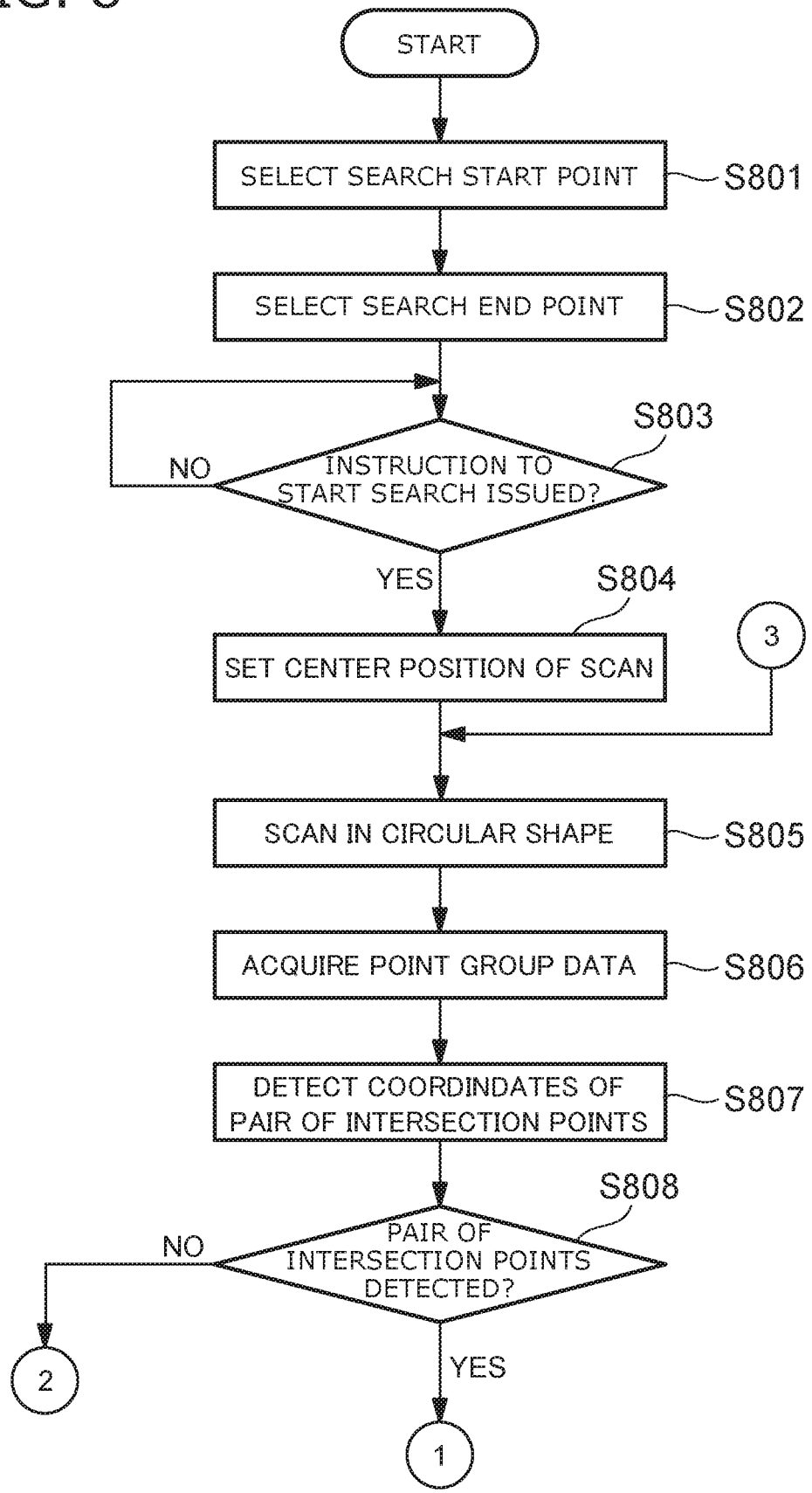
FIG. 8 is a flow chart showing processes executed by a calculation control unit.
Figure 9:
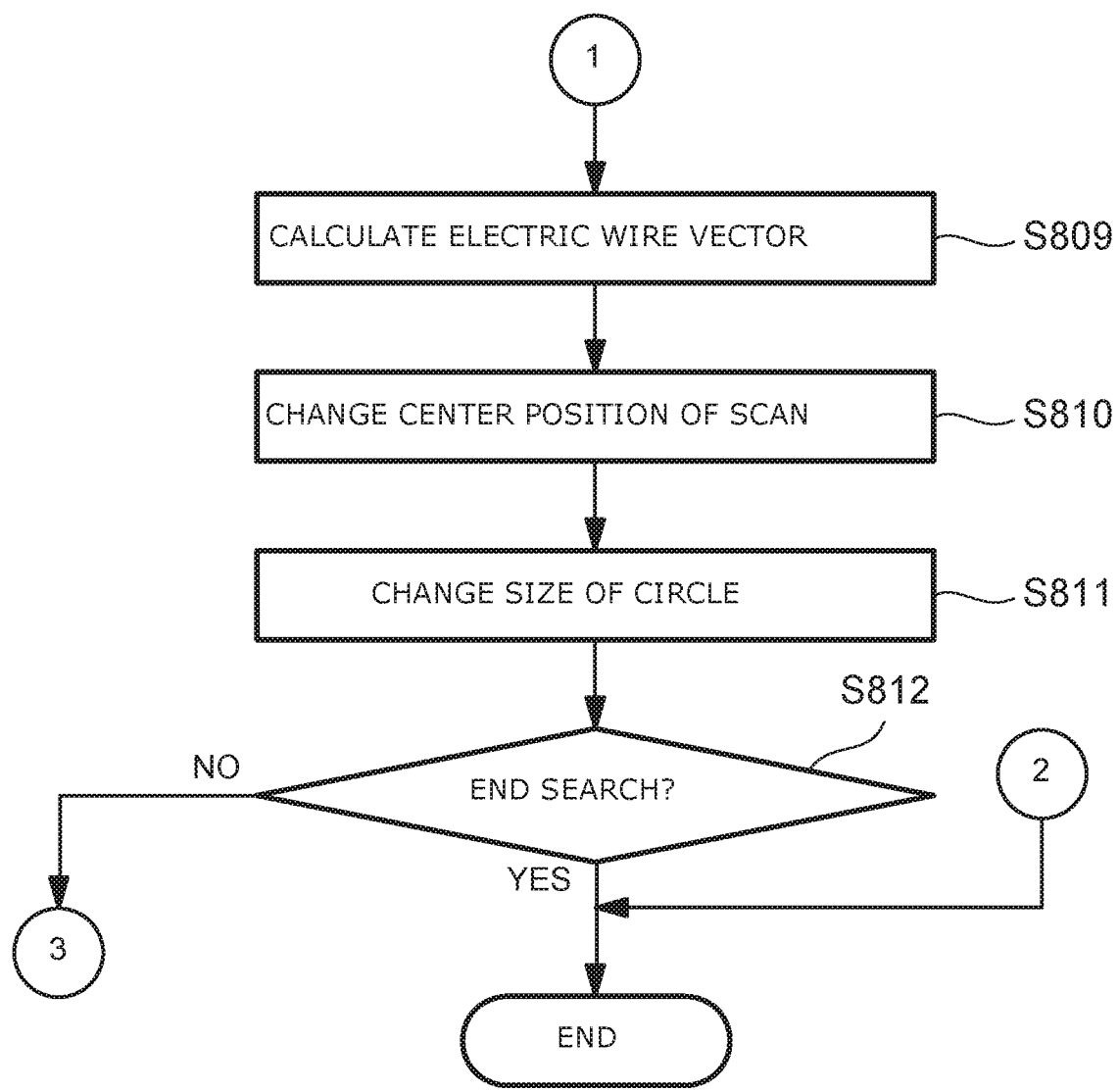
FIG. 9 is a flow chart showing processes executed by the calculation control unit.

Next, a process executed by the calculation control unit 19 will be described with reference to FIGS. 8 and 9. FIGS. 8 and 9 are flow charts showing the process executed by the calculation control unit 19. For example, the calculation control unit 19 is constituted by a central processing unit (CPU), a random access memory (RAM), a read only memory (ROM), a computer-readable storage medium, and the like. In addition, for example, a series of processes for realizing various functions are stored in a program format in the storage medium or the like, in which case the various functions are realized by having the CPU read the program to the RAM or the like and execute information processing and information calculation processes.

Figure 10:
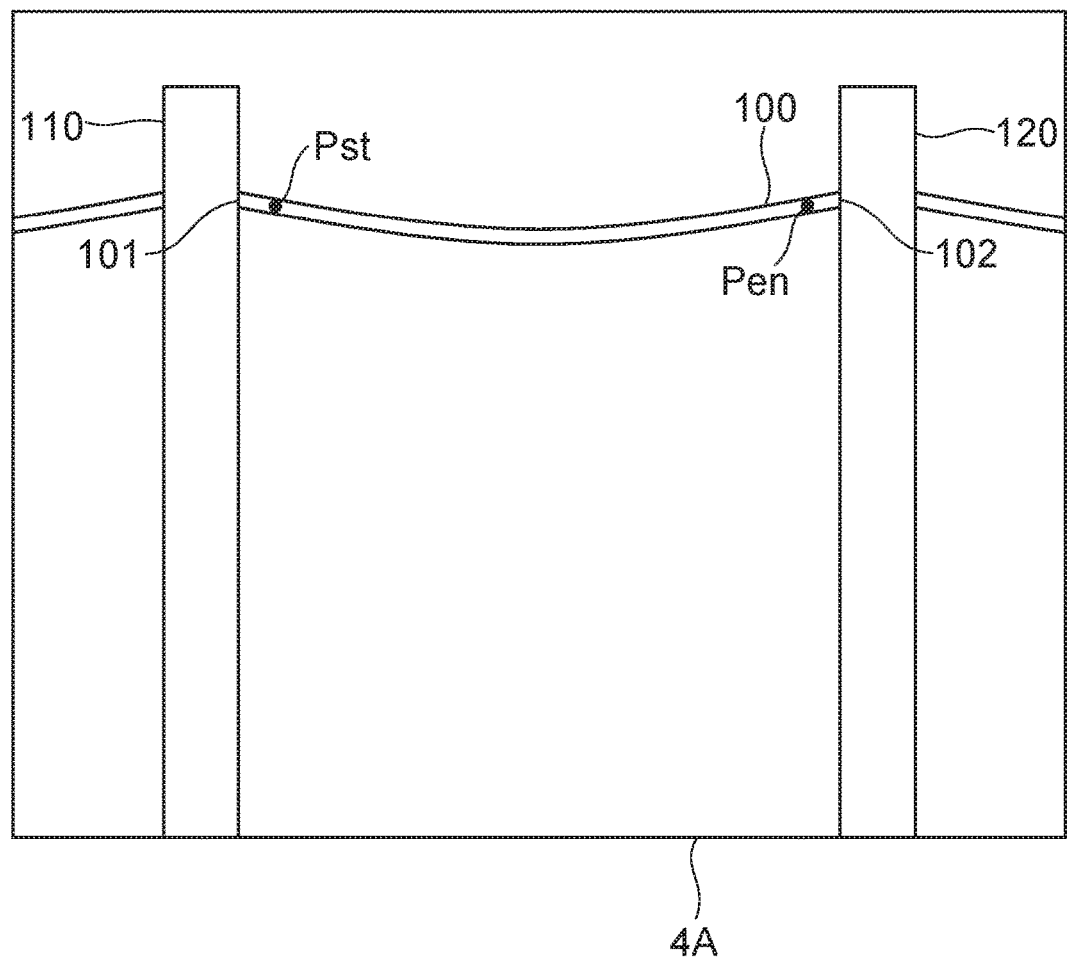
FIG. 10 is a diagram showing an example of an image displayed on an operation screen of an operating apparatus.

In step S801, the calculation control unit 19 selects a search start point Pst to be a start point where a search for the electric wire 100 is started on the basis of an instruction from an operator. As shown in FIG. 10, the calculation control unit 19 causes an image captured by the imaging unit 14 to be displayed on the operation screen 4A of the operating apparatus 4 and prompts the operator to input the search start point Pst. The reference characters shown in FIG. 10 are added for explanatory purposes and are not displayed on the operation screen 4A.

For example, the calculation control unit 19 displays a message reading "Touch search start point Pst" on the operation screen 4A. For example, a touch sensor is built into the operation screen 4A. The calculation control unit 19 recognizes a position on the operation screen 4A touched by a finger of the operator as the search start point Pst.

In step S802, the calculation control unit 19 selects a search end point to be an end point where the search for the electric wire 100 ends on the basis of an instruction from the operator. As shown in FIG. 10, the calculation control unit 19 causes an image captured by the imaging unit 14 to be displayed on the operation screen 4A of the operating apparatus 4 and prompts the operator to input a search end point Pen. For example, the calculation control unit 19 displays a message reading "Touch search end point Pen" on the operation screen 4A. The calculation control unit 19 recognizes a position on the operation screen 4A touched by a finger of the operator as the search end point Pen.

In step S803, the calculation control unit 19 determines whether or not an instruction to start a search for the electric wire 100 has been issued by the operator, and when it is determined that an instruction to start a search has been issued, the calculation control unit 19 advances the process to step S804. For example, the calculation control unit 19 causes a message reading "Start search?" and "YES" and "NO" buttons to be displayed on the operation screen 4A, and when the operator presses the "YES" button, the calculation control unit 19 determines that an instruction to start a search has been issued.

In step S804, the calculation control unit 19 sets a center position of a scan on the basis of the search start point Pst selected in step S801. The calculation control unit 19 calculates a horizontal angle $\theta 1$ and a vertical angle $\theta 2$ of a measurement point relative to the reference optical axis O so as to perform a scan in a circular shape around the search start point Pst. In this case, a scan refers to an operation of performing a scan relative to a prescribed center in a circumferential direction by one rotation with the measurement light 23. The calculation control unit 19 calculates the horizontal angle $\theta 1$ and the vertical angle $\theta 2$ so as to perform a scan in a circular shape around the search start point Pst on the electric wire 100 from two-dimensional coordinates of the search start point Pst on the operation screen 4A.

In step S805, the calculation control unit 19 performs a scan in a circular shape on the basis of the horizontal angle $\theta 1$ and the vertical angle $\theta 2$ calculated in step S804 or step S811. By rotating the optical prism 36a and the optical prism 36b so as to assume rotational positions in accordance with the horizontal angle $\theta 1$ and the vertical angle $\theta 2$, the calculation control unit 19 scans a prescribed center by one rotation in the circumferential direction with the measurement light 23. The distance measurement calculating unit 13 performs a distance measurement of the measurement point for each of a plurality of pulses included in the measurement light 23 on the basis of a light reception signal from the light receiving element 33 for the measurement light 23. The calculation control unit 19 stores distance measurement data obtained by the distance measurement by the distance measurement calculating unit 13 in the first storage unit 20.

Figure 11:
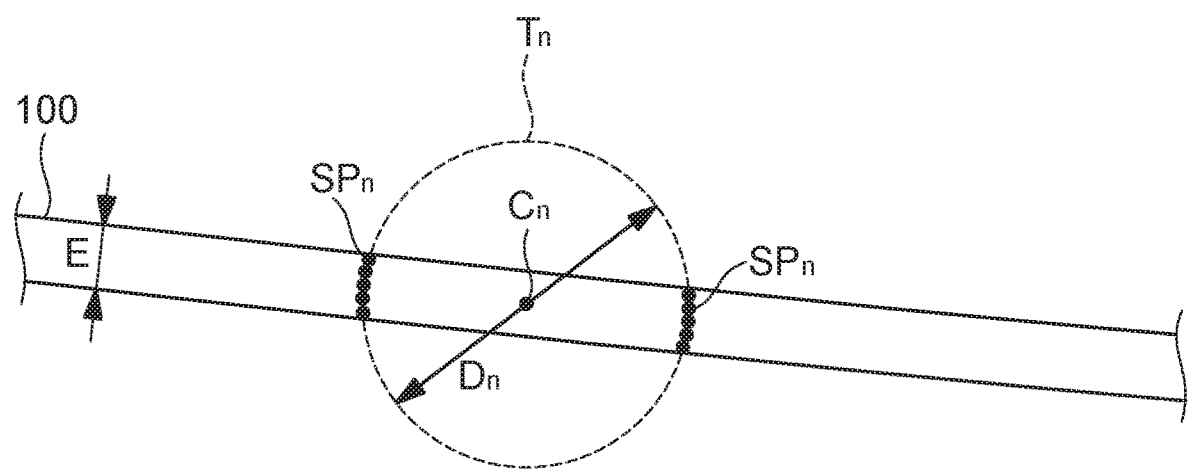
FIG. 11 is a diagram showing a state where an electric wire is scanned in a circular shape.

FIG. 11 is a diagram showing a state where the electric wire 100 is scanned in a circular shape. FIG. 11 is a diagram in which the electric wire 100 is viewed along the reference optical axis O in a similar manner to FIG. 5. In FIG. 11, a reference character $C_n$ denotes a position of a center position of a scan. A reference character $T_n$ denotes a scan trajectory with a scan performed around the center position $C_n$ with the measurement light 23. A reference character $SP_n$ denotes a plurality of measurement points by the pulsed measurement light 23.

By controlling rotations of the optical prism 36a and the optical prism 36b of the deflecting unit 35, the calculation control unit 19 is capable of adjusting a size of a circle (a diameter of the circle) indicating a scan trajectory with the measurement light 23 shown in FIG. 11. When executing step S805 after step S804, the calculation control unit 19 adjusts the circle to a size determined in advance. On the other hand, when executing step S805 after step S810 to be described later, a circular scan is to be performed in a size to which the circle is changed in step S810.

As shown in FIG. 11, when the electric wire 100 is scanned in a circular shape, the scan trajectory $T_n$ of the measurement light 23 and the electric wire 100 intersect each other at two locations. At each of the two locations, the measurement light 23 from the electric wire 100 is reflected at the plurality of measurement points $SP_n$ and received by the light receiving element 33. In this case, n denotes an arbitrary integer equal to or greater than 0, and it is assumed that n=0 at the search start point Pst and that n is added every time the horizontal angle θ1 and the vertical angle θ2 are changed from the search start point Pst. The example shown in FIG. 11 represents a state where a scan in a circular shape is performed after changing the horizontal angle θ1 and the vertical angle θ2 n-number of times from the search start point Pst.

In step S806, on the basis of the horizontal angle θ1 and the vertical angle θ2 of the measurement light 23 calculated in step S804 and distance measurement data of the plurality of measurement points $SP_n$ stored in the first storage unit 20, the calculation control unit 19 acquires point group data that is an aggregate of three-dimensional coordinates of the plurality of measurement points $SP_n$. Specifically, the calculation control unit 19 acquires point group data by associating the horizontal angle θ1 and the vertical angle θ2 of the measurement light 23 with the distance measurement data of each measurement point $SP_n$. The calculation control unit 19 stores the acquired point group data in the first storage unit 20.

In step S807, the calculation control unit 19 detects coordinates of a pair of intersection points $P_n$ indicating positions where the scan trajectory $T_n$ of the measurement light 23 and the electric wire 100 intersect each other from the point group data stored in the first storage unit 20 in step S806. The pair of intersection points $P_n$ are arranged to the left and to the right of the center position $C_n$ in FIG. 11. For example, the calculation control unit 19 obtains coordinates of the intersection point $P_n$ to the left of the center position $C_n$ by calculating an average value of coordinates of point group data of a plurality of points to the left of the center position $C_n$. In addition, for example, the calculation control unit 19 obtains coordinates of the intersection point $P_n$ to the right of the center position $C_n$ by calculating an average value of coordinates of point group data of a plurality of points to the right of the center position $C_n$.

In this case, point group data refers to data calculated on the basis of the horizontal angle θ1 and the vertical angle θ2 of the measurement light 23 and distance measurement data (a measurement result) of the plurality of measurement points $SP_n$ stored in the first storage unit 20. Therefore, the calculation control unit 19 detects coordinates of the pair of intersection points $P_n$ on the basis of a distance measurement result of the distance measuring unit 3A and the horizontal angle θ1 and the vertical angle θ2 detected by the emission direction detecting unit 15.

While the coordinates of the intersection points $P_n$ are obtained by calculating an average value of coordinates of a plurality of pieces of point group data, other modes may be adopted instead. For example, light reception intensity by the light receiving element 33 of the reflected measurement light 24 which corresponds to each piece of point group data may be stored together with coordinates of a plurality of pieces of point group data, and point group data with highest light reception intensity among the plurality of pieces of point group data may be adopted as the coordinates of the intersection points $P_n$.

In step S808, the calculation control unit 19 determines whether or not coordinates of the pair of intersection points $P_n$ have been detected in step S807, and when a positive determination is made, the calculation control unit 19 advances the process to step S809 but when a negative determination is made, the calculation control unit 19 ends the process of the present flow chart. The calculation control unit 19 makes a negative determination when no intersection points are detected or when only one intersection point is detected.

In step S809, the calculation control unit 19 calculates an electric wire vector $V_n$ on the basis of the coordinates of the pair of intersection points $P_n$ detected in step S807. The electric wire vector $V_n$ is a vector of which a terminal point is a center position $C_{n+1}$ of a scan to be performed after the present scan of the center position $C_n$. The calculation control unit 19 calculates a vector having coordinates $M_n$ of a midpoint of the pair of intersection points $P_n$ detected in step S807 as an initial point and a length that is a times a diameter $D_n$ of the circular scan trajectory $T_n$. The calculation control unit 19 determines an orientation of the electric wire vector $V_n$ to a direction that passes the intersection point $P_n$ which is closer to the search end point Pen among the pair of intersection points $P_n$.

The calculation control unit 19 sets a to, for example, a value equal to or larger than ⅓ and equal to or smaller than ⅔. Setting a to ⅓ or more can prevent scan density of the electric wire 100 from becoming excessively high and a data amount of the point group data of the electric wire 100 from becoming excessively large, and can suppress an increase in acquisition time of the point group data. Setting a to ⅔ or less ensures that the scan trajectory with the measurement light 23 in a circular scan to be performed next and the electric wire 100 intersect each other at two points. Therefore, a failure can be suppressed where an excessive increase in the length of the electric wire vector $V_n$ prevents a pair of intersection points from being acquired when performing a circular scan of the electric wire 100 having a curved shape.

Figure 12:
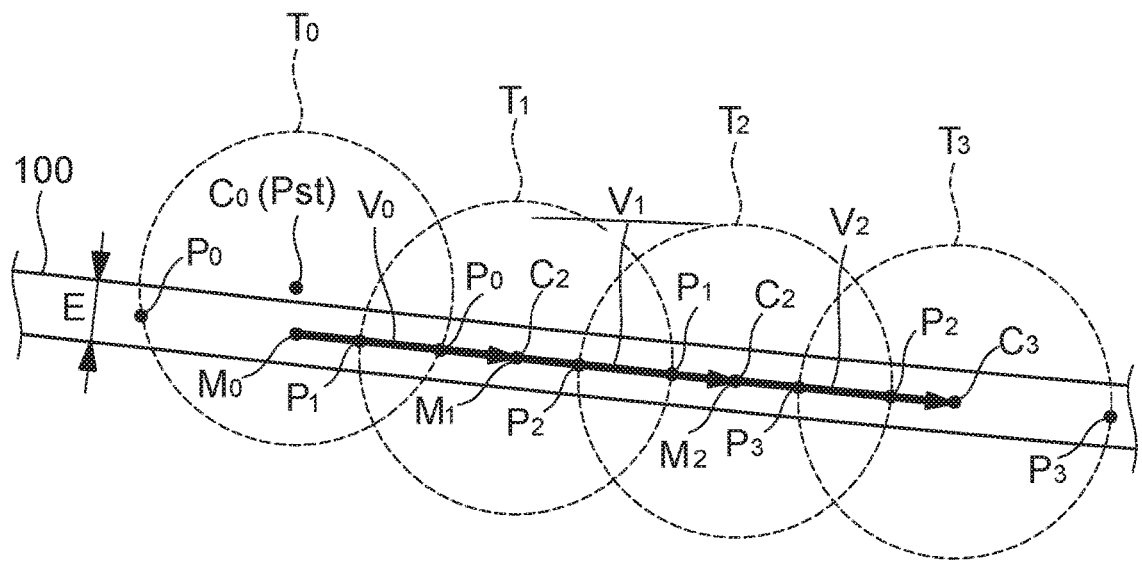
FIG. 12 is a diagram showing intersection points which are detected when performing a scan in a circular shape multiple of times from a search start point and electric wire vectors.
Figure 13:
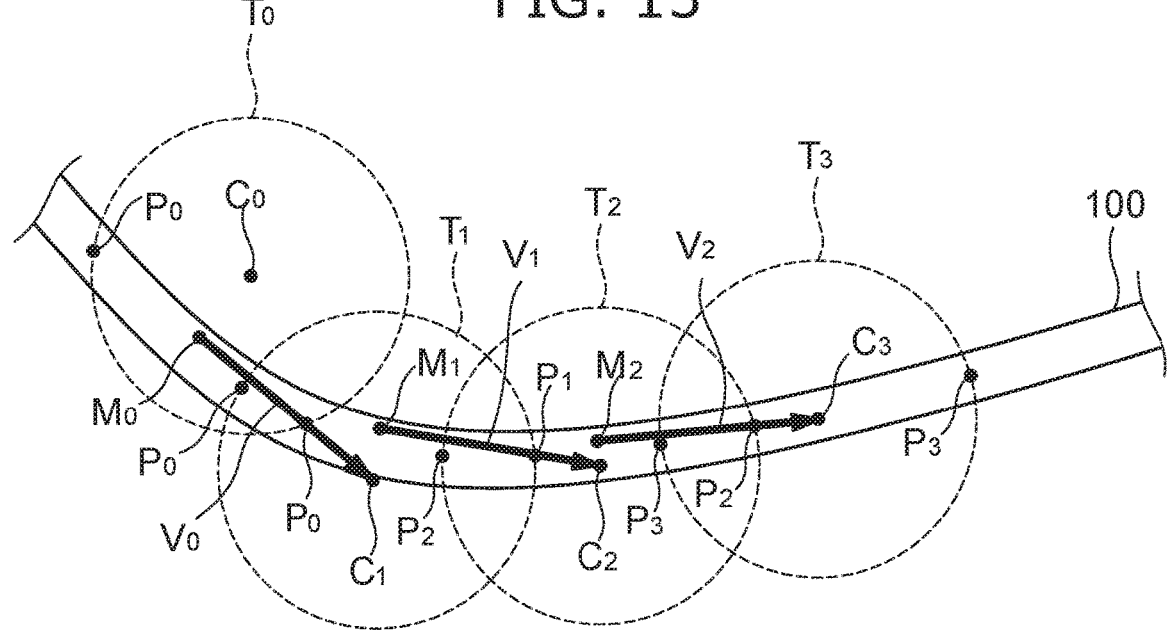
FIG. 13 is a diagram showing intersection points which are detected when performing a scan in a circular shape multiple times from a search start point and electric wire vectors.

FIGS. 12 and 13 are diagrams showing intersection points which are detected when performing a scan in a circular shape multiple times from the search start point Pst and electric wire vectors. FIG. 12 shows a case where the electric wire 100 extends in a linear shape and FIG. 13 shows a case where the electric wire 100 extends in a curved shape. As shown in FIGS. 12 and 13, the calculation control unit 19 detects a pair of intersection points $P_0$ when performing a circular scan at the search start point Pst.

The calculation control unit 19 calculates an electric wire vector $V_0$ having coordinates $M_0$ of a midpoint of a pair of intersection points $P_0$ as an initial point and a length that is a times a diameter $D_0$ of a circular scan trajectory $T_0$. The calculation control unit 19 determines an orientation of the electric wire vector $V_0$ to a direction that passes the intersection point $P_0$ which is closer to the search end point Pen among the pair of intersection points $P_0$. In a similar manner, the calculation control unit 19 calculates an electric wire vector $V_1$ having coordinates $M_1$ of a midpoint of a pair of intersection points $P_1$ as an initial point and a length that is a times a diameter $D_1$ of a circular scan trajectory $T_1$. The calculation control unit 19 determines an orientation of the electric wire vector $V_1$ to a direction that passes the intersection point $P_1$ which is closer to the search end point Pen among the pair of intersection points $P_1$.

In addition, the calculation control unit 19 calculates an electric wire vector $V_2$ having coordinates $M_2$ of a midpoint of a pair of intersection points $P_2$ as an initial point and a length that is α times a diameter $D_2$ of a circular scan trajectory $T_2$. The calculation control unit 19 determines an orientation of the electric wire vector $V_2$ to a direction that passes the intersection point $P_2$ which is closer to the search end point Pen among the pair of intersection points $P_2$.

Figure 14:
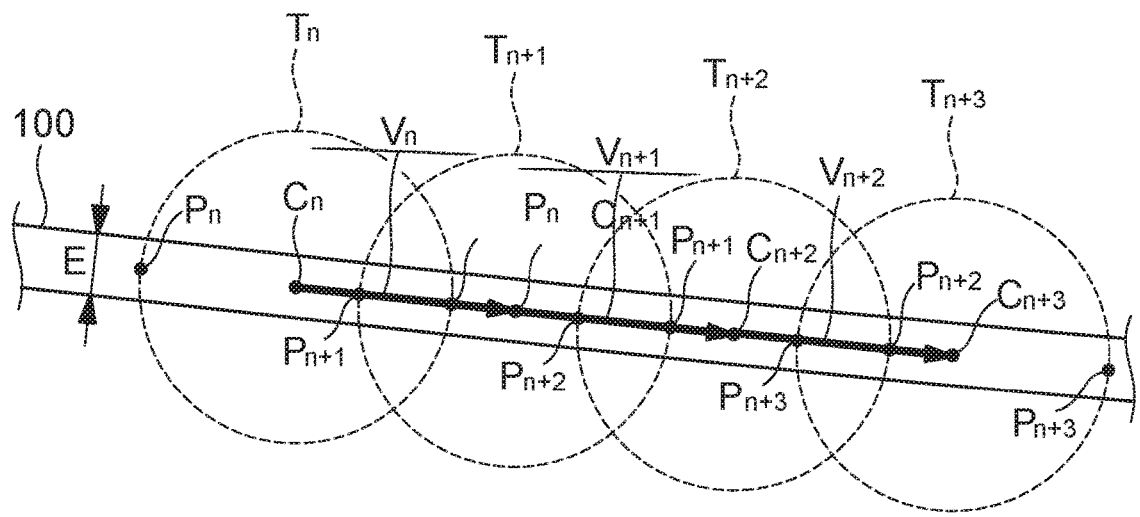
FIG. 14 is a diagram showing intersection points which are detected when performing a circular scan from an n-th time to an n+3-th time and electric wire vectors in the measurement system according to the first embodiment.
Figure 15:
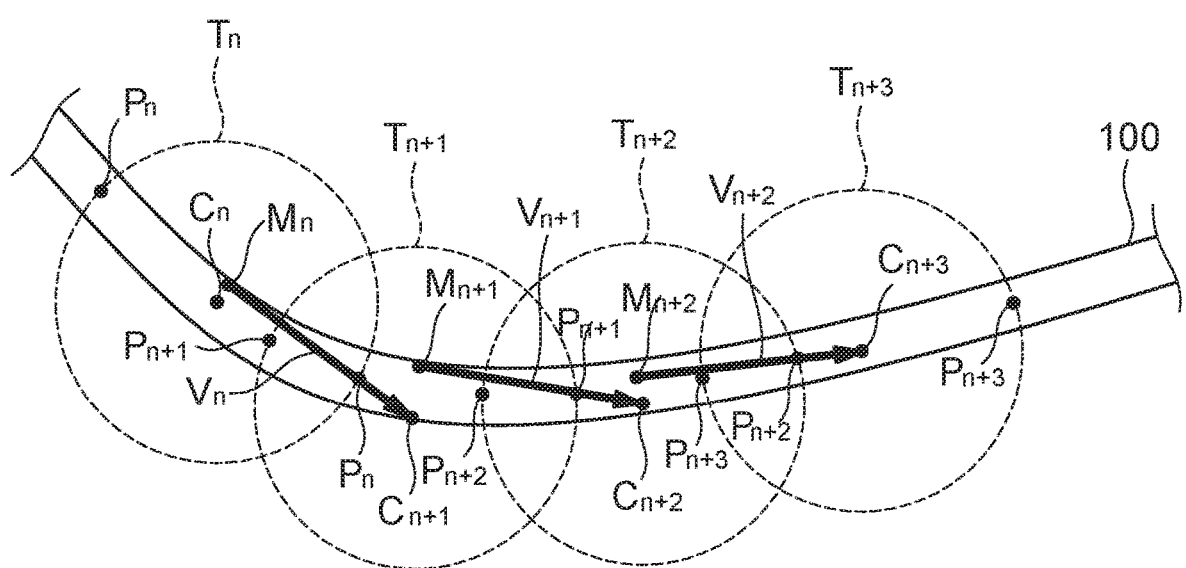
FIG. 15 is a diagram showing intersection points which are detected when performing a circular scan from an n-th time to an n+3-th time and electric wire vectors in the measurement system according to the first embodiment.

FIGS. 14 and 15 are diagrams showing intersection points which are detected when performing a circular scan from an n-th time to an n+3-th time and electric wire vectors. FIG. 14 shows a case where the electric wire 100 extends in a linear shape and FIG. 15 shows a case where the electric wire 100 extends in a curved shape. As shown in FIGS. 14 and 15, the calculation control unit 19 detects a pair of intersection points $P_n$ when performing a circular scan at a center position $C_n$.

The calculation control unit 19 calculates an electric wire vector $V_n$ having a center position $C_n$ that is a midpoint of a pair of intersection points $P_n$ as an initial point and a length that is a times a diameter $D_n$ of a circular scan trajectory $T_n$. The calculation control unit 19 determines an orientation of the electric wire vector $V_n$ to a direction that passes the intersection point $P_n$ which is closer to the search end point Pen among the pair of intersection points $P_n$. In a similar manner, the calculation control unit 19 calculates an electric wire vector $V_{n+1}$ having a center position $C_{n+1}$ that is a midpoint of a pair of intersection points $P_{n+1}$ as an initial point and a length that is a times a diameter $D_{n+1}$ of a circular scan trajectory $T_{n+1}$. The calculation control unit 19 determines an orientation of the electric wire vector $V_{n+1}$ to a direction that passes the intersection point $P_{n+1}$ which is closer to the search end point Pen among the pair of intersection points $P_{n+1}$.

In addition, the calculation control unit 19 calculates an electric wire vector $V_{n+2}$ having a center position $C_{n+2}$ that is a midpoint of a pair of intersection points $P_{n+2}$ as an initial point and a length that is a times a diameter $D_{n+2}$ of a circular scan trajectory $T_{n+2}$. The calculation control unit 19 determines an orientation of the electric wire vector $V_{n+2}$ to a direction that passes the intersection point $P_{n+2}$ which is closer to the search end point Pen among the pair of intersection points $P_{n+2}$.

In step S810, the calculation control unit 19 changes a center position of a scan to the terminal point of the electric wire vector calculated in step S809. The calculation control unit 19 calculates the horizontal angle $\theta1$ and the vertical angle $\theta2$ of a measurement point relative to the reference optical axis O so as to perform a scan in a circular shape around the terminal point of the electric wire vector. The calculation control unit 19 has set a to a value equal to or larger than $1/3$ and equal to or smaller than $2/3$ as described earlier.

Therefore, the calculation control unit 19 changes the horizontal angle $\theta1$ and the vertical angle $\theta2$ on the basis of the coordinates of the pair of intersection points $P_n$ so that the scan trajectory with the measurement light 23 by the present circular scan and the scan trajectory with the measurement light 23 by a circular scan to be performed next overlap with each other and the scan trajectory with the measurement light 23 by the circular scan to be performed next and the electric wire 100 reliably intersect with each other at two points.

As described earlier, the calculation control unit 19 determines an orientation of the electric wire vector $V_n$ to a direction that passes the intersection point $P_n$ which is closer to the search end point Pen among the pair of intersection points $P_n$. Therefore, the calculation control unit 19 changes the horizontal angle $\theta1$ and the vertical angle $\theta2$ so that a center of coordinates of the pair of intersection points $P_n$ continuously moves either leftward or rightward in the horizontal direction.

In addition, as shown in FIGS. 12 to 15, the calculation control unit 19 calculates the electric wire vector $V_n$ so that a circular scan is performed centered on an extension of the coordinates of the pair of intersection points $P_n$. Therefore, the calculation control unit 19 changes the horizontal angle $\theta1$ and the vertical angle $\theta2$ so that a center position is arranged on an extension of the coordinates of the pair of intersection points $P_n$.

In step S811, the calculation control unit 19 changes a size of the circle (a diameter of the scan trajectory) of the measurement light 23 by the circular scan to be performed next to a suitable size. As shown in FIG. 11, the calculation control unit 19 changes a diameter $D_n$ of the scan trajectory so that the diameter $D_n$ of the scan trajectory at a position where the electric wire 100 is arranged is β times a thickness E of the electric wire 100. The diameter $D_n$ of the scan trajectory refers to a diameter of the scan trajectory at a position where the electric wire 100 is arranged.

The calculation control unit 19 is assumed to calculate the thickness E of the electric wire on the basis of a plurality of measurement points $SP_n$. In addition, the calculation control unit 19 sets β to, for example, a value equal to or larger than 5 and equal to or smaller than 10. The diameter $D_n$ of the scan trajectory at a position where the electric wire 100 is arranged is made to be proportional to the thickness E of the electric wire 100 in order to measure the electric wire 100 at constant scan density regardless of a distance from the measurement system 1 to the electric wire 100.

The calculation control unit 19 corrects the horizontal angle $\theta1$ and the vertical angle $\theta2$ calculated in step S810 so that the size of the circle (the diameter of the scan trajectory) of the measurement light 23 equals the diameter $D_n$. By executing steps S810 and S811, the calculation control unit 19 changes the horizontal angle $\theta1$ and the vertical angle $\theta2$ so that a circular scan centered on the terminal point of the electric wire vector calculated in step S809 and having the diameter $D_n$ set in step S811 is performed.

In step S812, the calculation control unit 19 determines whether or not the electric wire 100 is to be searched, and when a positive determination is made, the calculation control unit 19 ends the process of the present flow chart, but when a negative determination is made, the calculation control unit 19 once again executes the processes of step S805 and thereafter. By repetitively executing the processes of steps S805 to S811, the calculation control unit 19 continuously acquires point group data of the electric wire 100 from the search start point Pst to the search end point Pen. In step S812, the calculation control unit 19 makes a negative determination when, for example, the center position of the scan changed in step S804 is within a prescribed distance from the search end point Pen.

Operational advantages of the measurement system 1 according to the present embodiment described above will now be described.

According to the measurement system 1 of the present embodiment, coordinates of a pair of intersection points $P_n$ of the electric wire 100 which is an object to be measured that is formed in at least any of a linear shape, a rod shape, and a columnar shape and a scan trajectory with measurement light 23 are detected on the basis of a distance measurement result by the distance measuring unit 3A and a horizontal angle $\theta1$ and a vertical angle $\theta2$ of the measurement light 23. The detection of the coordinates of the pair of intersection points $P_n$ indicates a state where the measurement light 23 for performing a scan in a circumferential direction is measuring the electric wire 100.

In addition, in the state where the electric wire 100 is being measured, the horizontal angle θ1 and the vertical angle θ2 of the measurement light 23 are changed so that the scan trajectory with the measurement light 23 and the electric wire 100 intersect each other. Therefore, even after the horizontal angle θ1 and the vertical angle θ2 of the measurement light 23 are changed, a state where the electric wire 100 is being measured is maintained. By repetitively changing the horizontal angle θ1 and the vertical angle θ2 of the measurement light 23 in this manner, an entirety of the electric wire 100 can be measured in a simple and efficient manner.

In addition, according to the measurement system 1 of the present embodiment, since an electric wire vector in a direction from the search start point Pst toward the search end point Pen is calculated, a region from one end 101 to the other end 102 of the electric wire can be continuously measured either leftward or rightward in the horizontal direction.

Furthermore, according to the measurement system 1 of the present embodiment, since a center of the scan trajectory with the measurement light 23 is arranged on an extension of the coordinates of the pair of intersection points $P_n$, when the electric wire 100 extends linearly, the electric wire 100 can be reliably measured even after changing the horizontal angle θ1 and the vertical angle θ2 of the measurement light 23.

Second Embodiment

Next, a measurement system according to a second embodiment of the present invention will be described. The measurement system according to the second embodiment is a modification of the measurement system 1 according to the first embodiment and is assumed to be similar to the measurement system 1 according to the first embodiment unless specifically noted otherwise hereinafter.

In the measurement system 1 according to the first embodiment, the calculation control unit 19 calculates an electric wire vector $V_n$ having coordinates $M_n$ of a midpoint of a pair of intersection points $P_n$ as an initial point and a length that is a times a diameter $D_n$ of a circular scan trajectory $T_n$. In contrast, the calculation control unit 19 according to the present embodiment calculates an electric wire vector $V_n$ having either one of the pair of intersection points $P_n$ as a terminal point.

Figure 16:
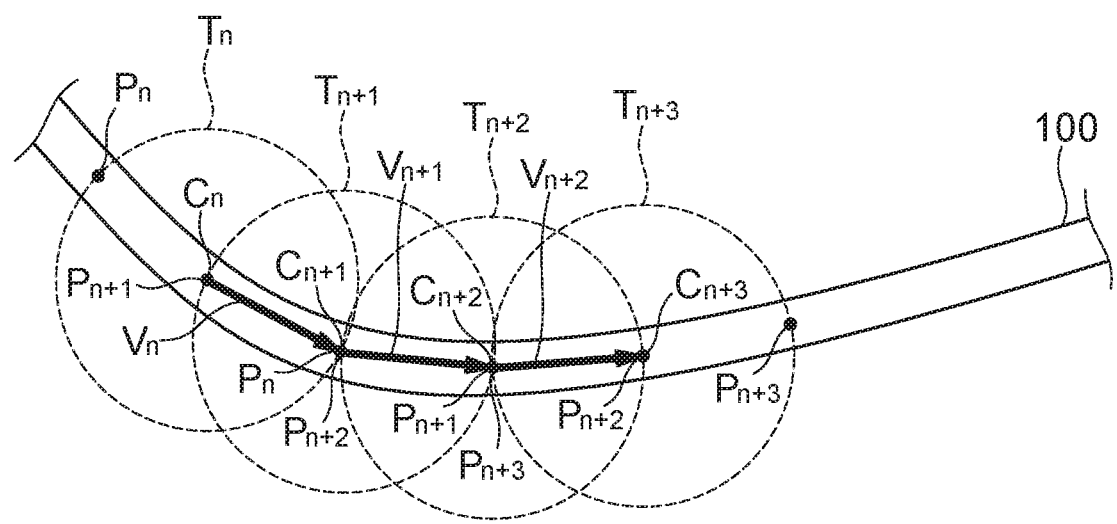
FIG. 16 is a diagram showing intersection points which are detected when performing a circular scan from an n-th time to an n+3-th time and electric wire vectors in a measurement system according to a second embodiment.

FIG. 16 is a diagram showing intersection points which are detected when performing a circular scan from an n-th time to an n+3-th time and electric wire vectors in the measurement system according to the present embodiment. As shown in FIG. 16, the calculation control unit 19 detects a pair of intersection points $P_n$ when performing a circular scan at a center position $C_n$.

The calculation control unit 19 calculates an electric wire vector $V_n$ having the center position $C_n$ as an initial point and either one of the pair of intersection points $P_n$ as a terminal point. In a similar manner, the calculation control unit 19 calculates an electric wire vector $V_{n+1}$ having a center position $C_{n+1}$ as an initial point and either one of a pair of intersection points $P_{n+1}$ as a terminal point. In a similar manner, the calculation control unit 19 calculates an electric wire vector $V_{n+2}$ having a center position $C_{n+2}$ as an initial point and either one of a pair of intersection points $P_{n+2}$ as a terminal point. The calculation control unit 19 calculates the electric wire vectors $V_n$, $V_{n+1}$, and $V_{n+2}$ so as to have, as terminal points, the intersection points $P_n$, $P_{n+1}$, and $P_{n+2}$ which are closer to the search end point Pen among the pairs of intersection points $P_n$, $P_{n+1}$, and $P_{n+2}$.

As shown in FIG. 16, the calculation control unit 19 calculates the electric wire vector $V_n$ so that the center position $C_{n+1}$ is arranged at either one of the pair of intersection points $P_n$. Therefore, the calculation control unit 19 changes the horizontal angle θ1 and the vertical angle θ2 so that the center position $C_{n+1}$ is arranged at either one of the pair of intersection points $P_n$.

According to the measurement system of the present embodiment, since a center position is arranged at coordinates of either one of the pair of intersection points $P_n$, even when the electric wire 100 extends in a curved shape or even when a direction in which the electric wire 100 extends changes, the electric wire 100 can be reliably measured after changing the horizontal angle θ1 and the vertical angle θ2.

Third Embodiment

Next, a measurement system according to a third embodiment of the present invention will be described. The measurement system according to the present embodiment is a modification of the measurement system 1 according to the first embodiment and is assumed to be similar to the measurement system 1 according to the first embodiment unless specifically noted otherwise hereinafter.

The present embodiment represents a change in contents of the process of detecting coordinates of a pair of intersection points in step S807 of the first embodiment. The present embodiment relates to a specific process when detecting coordinates of three or more intersection points in step S807.

Figure 17:
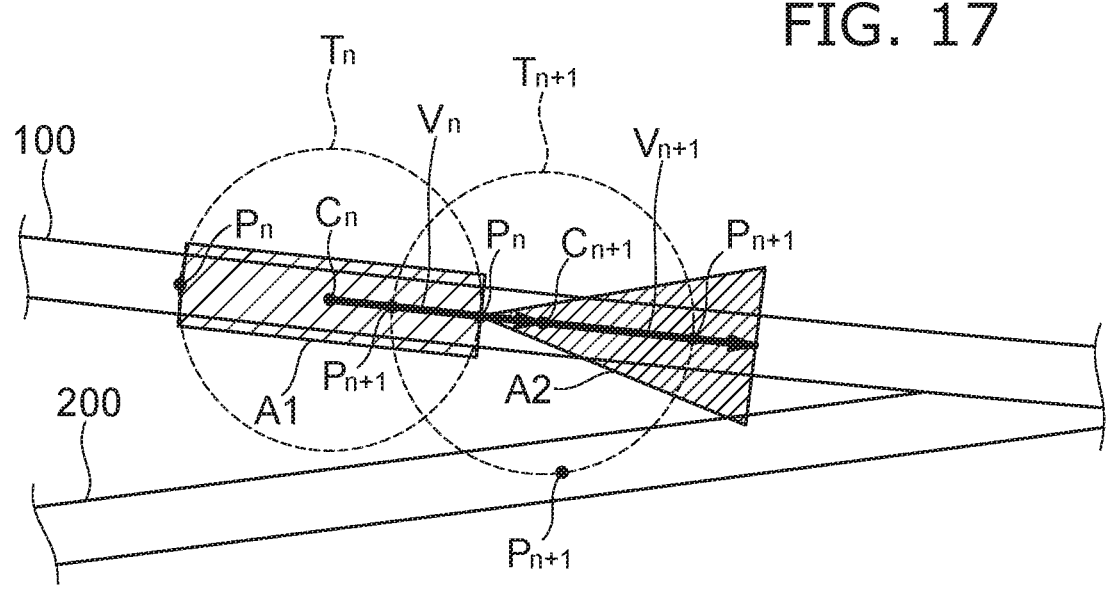
FIG. 17 is a diagram showing a state where an electric wire is scanned in a circular shape in a measurement system according to a third embodiment.

FIG. 17 is a diagram showing a state where the electric wire 100 and an electric wire 200 are scanned in a circular shape in the measurement system according to the present embodiment. In this case, although the electric wire 100 is an object to be measured of the measurement system 1, the electric wire 200 is not an object to be measured of the measurement system 1. A distance in the axis X direction from the measurement system 1 to the electric wire 100 is shorter than a distance in the axis X direction from the measurement system 1 to the electric wire 200.

When detecting coordinates of a pair of intersection points $P_{n+1}$, the calculation control unit 19 according to the present embodiment estimates a range of the coordinates of the pair of intersection points $P_{n+1}$ on the basis of coordinates of a pair of intersection points $P_n$. The calculation control unit 19 estimates a range A1 of coordinates of the intersection point $P_{n+1}$ which is closer to the search start point Pst among the pair of intersection points $P_{n+1}$. As shown in FIG. 17, the range A1 is, for example, a cylindrical space formed so as to extend in a same direction as the electric wire 100 with the pair of intersection points $P_n$ as an end part. A diameter of a section of the cylindrical space is desirably set larger than a diameter of the electric wire 100. When coordinates of the intersection point $P_{n+1}$ which is closer to the search start point Pst are included in the range A1, the calculation control unit 19 detects the intersection point $P_{n+1}$ which is closer to the search start point Pst as a correct intersection point.

The calculation control unit 19 estimates a range A2 of coordinates of the intersection point $P_{n+1}$ which is closer to the search end point Pen among the pair of intersection points $P_{n+1}$. As shown in FIG. 17, the range A2 is, for example, a conical space with the pair of intersection points $P_n$ as an apex and a terminal point of an electric wire vector $V_{n+1}$ as a base. When coordinates of the intersection point $P_{n+1}$ which is closer to the search end point Pen are included in the range A2, the calculation control unit 19 detects the intersection point $P_{n+1}$ which is closer to the search end point Pen as a correct intersection point.

Since the intersection point $P_{n+1}$ on the electric wire 200 is neither included in the range A1 nor the range A2, the calculation control unit 19 does not detect the intersection point $P_{n+1}$ on the electric wire 200 as a correct intersection point. This is because the intersection point $P_{n+1}$ on the electric wire 200 is arranged at a position that significantly differs from the intersection point $P_{n+1}$ on the electric wire 100. In other words, in the example shown in FIG. 17, the calculation control unit 19 detects the intersection point $P_{n+1}$ on the electric wire 100 as a correct intersection point but does not detect the intersection point $P_{n+1}$ on the electric wire 200 as a correct intersection point. As a result, the calculation control unit 19 can proceed with the process of detecting the pair of intersection points $P_{n+1}$ on the electric wire 100 which is an object to be measured and acquiring point group data.

According to the measurement apparatus of the present embodiment, ranges A1 and A2 of coordinates of a pair of intersection points $P_{n+1}$ detected after changing the horizontal angle θ1 and the vertical angle θ2 of the measurement light 23 are estimated and coordinates included in the estimated ranges A1 and A2 are detected as coordinates of a pair of intersection points $P_{n+1}$. Therefore, even when the electric wire 200 which is another object to be measured is present behind the electric wire 100 which is an object to be measured, coordinates of intersection points on the electric wire 200 which are not included in estimated coordinate ranges A1 and A2 can be eliminated and errors in measurement can be suppressed.

Fourth Embodiment

Next, a measurement system according to a fourth embodiment of the present invention will be described. The measurement system according to the present embodiment is a modification of the measurement system 1 according to the first embodiment and is assumed to be similar to the measurement system 1 according to the first embodiment unless specifically noted otherwise hereinafter.

Figure 18:
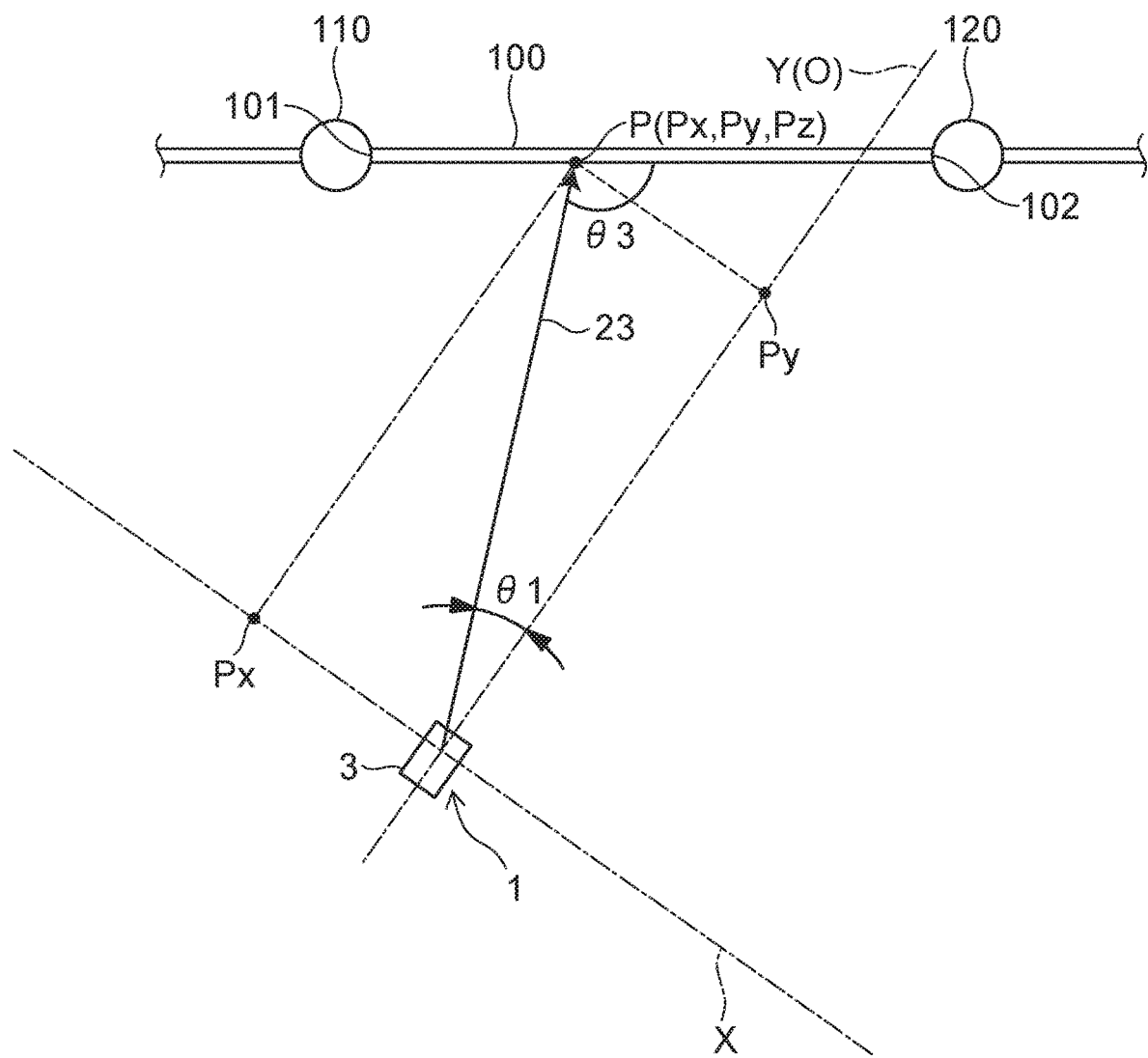
FIG. 18 is an X-Y plan view in which an electric wire and a measurement system are viewed from above in a measurement system according to a fourth embodiment.

As shown in FIG. 6, in the measurement system 1 according to the first embodiment, the reference optical axis O is arranged so as to be orthogonal to a direction in which the electric wire 100 extends. In addition, a circular scan is performed by the measurement light 23 in the measurement system 1 according to the first embodiment. In contrast, in the measurement system 1 according to the present embodiment, as shown in FIG. 18, the reference optical axis O is arranged such that a direction in which the electric wire 100 extends and a direction of the measurement light 23 form an inclination angle θ3 that is an obtuse angle larger than 90 degrees. In addition, an elliptical scan is performed by the measurement light 23 in the measurement system 1 according to the present embodiment.

Figure 19:
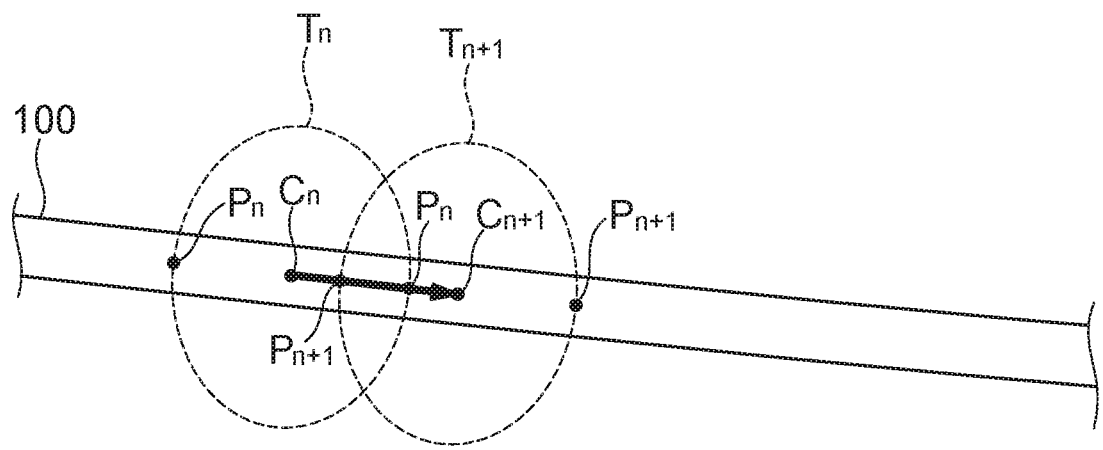
FIG. 19 is a diagram showing intersection points which are detected when performing an elliptical scan from an n-th time to an n+1-th time and electric wire vectors in a measurement system according to the fourth embodiment.
Figure 20:
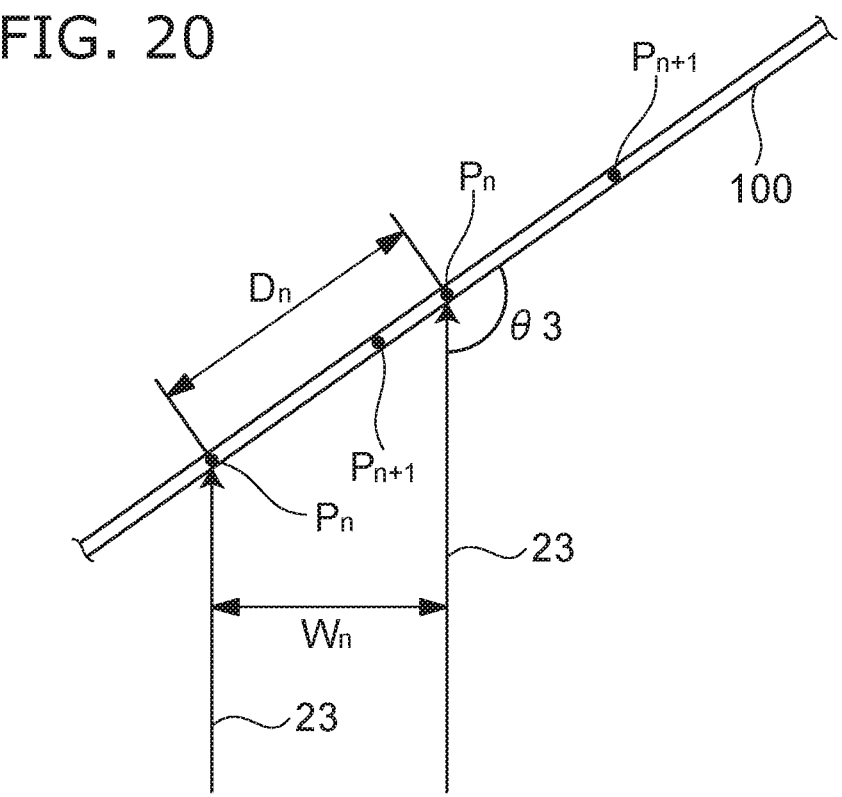
FIG. 20 is a diagram showing, from above, the electric wire shown in FIG. 19.

FIG. 19 is a diagram showing intersection points which are detected when performing a circular scan from an n-th time to an n+1-th time and electric wire vectors in the measurement system according to the present embodiment. FIG. 20 is a diagram showing, from above, the electric wire 100 shown in FIG. 19. As shown in FIG. 19, the calculation control unit 19 controls a deflection operation of the deflecting unit 35 so that a scan in an elliptical shape with a direction connecting a pair of intersection points $P_n$ as a minor axis is performed by the measurement light 23. By controlling the deflecting unit 35, the calculation control unit 19 is capable of adjusting a length of the minor axis of the elliptical scan trajectory shown in FIG. 19.

The calculation control unit 19 according to the present embodiment adjusts a length of the minor axis of the elliptical scan trajectory in order to prevent intervals of the intersection points $P_n$ and $P_{n+1}$ on the electric wire 100 from becoming wider than those in the first embodiment. When the intervals of the intersection points $P_n$ and $P_{n+1}$ on the electric wire 100 widen, scan density decreases and point group data with desired scan density can no longer be acquired from the electric wire 100. In consideration thereof, by adjusting a length of the minor axis of the scan trajectory with the measurement light 23 in accordance with the inclination angle θ3, the calculation control unit 19 according to the present embodiment makes the intervals of the intersection points $P_n$ and $P_{n+1}$ on the electric wire 100 equal to those in the first embodiment.

In FIG. 20, the interval of the pair of intersection points $P_n$ on the electric wire 100 is equal to the diameter $D_n$ of the circular scan trajectory $T_n$ according to the first embodiment. The calculation control unit 19 adjusts the length of the minor axis of the scan trajectory with the measurement light 23 to $W_n$ so that the interval of the pair of intersection points $P_n$ on the electric wire 100 equals the diameter $D_n$. The length $W_n$ of the minor axis is a length in the axis X direction and satisfies $W_n = D_n \cdot \sin(\theta 3)$, where the inclination angle θ3 is an angle formed by a straight line connecting the pair of intersection points $P_n$ and the measurement light 23 on the X-Y plane.

By adjusting the length of the minor axis of the scan trajectory with the measurement light 23 to $W_n$, the calculation control unit 19 can make the intervals of the intersection points $P_n$ and $P_{n+1}$ on the electric wire 100 equal to those in the first embodiment. The calculation control unit 19 calculates the inclination angle θ3 on the basis of the distance measurement data of the pair of intersection points $P_n$ and calculates the length $W_n$ of the minor axis of the scan trajectory with the measurement light 23. As shown in FIG. 20, the calculation control unit 19 controls a deflection operation of the deflecting unit 35 on the basis of the inclination angle θ3 so that a length connecting the pair of intersection points $P_n$ is kept constant at $D_n$.

As described above, the calculation control unit 19 controls a direction of emission (the horizontal angle θ1 and the vertical angle θ2) of the measurement light 23 so that the scan trajectory with the measurement light 23 assumes an elliptical shape with a direction connecting a pair of intersection points $P_n$ as a minor axis. In addition, the calculation control unit 19 controls a direction of emission (the horizontal angle θ1 and the vertical angle θ2) of the measurement light 23 so that the minor axis equals a length $W_n$ in accordance with the inclination angle θ3 formed between a straight line connecting the pair of intersection points $P_n$ and the measurement light 23.

Figure 21:
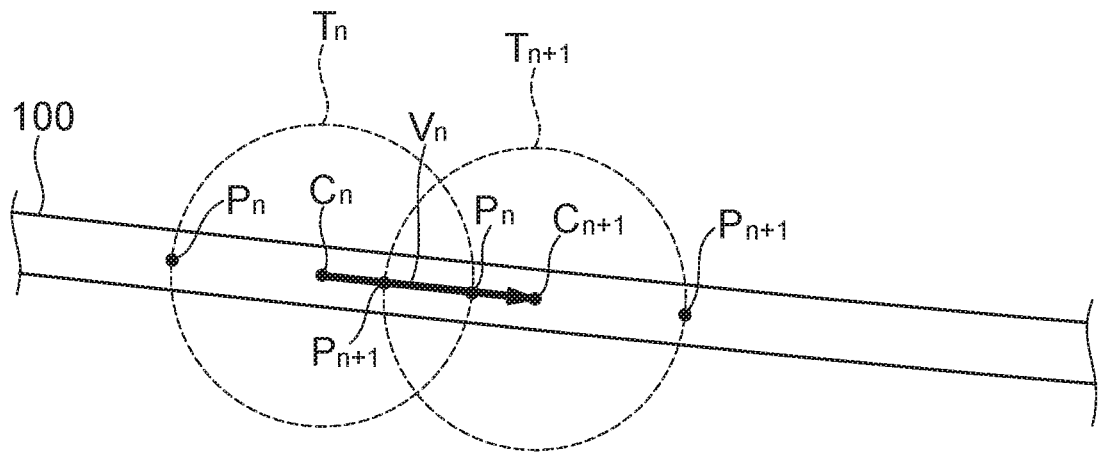
FIG. 21 is a diagram showing intersection points which are detected when performing a circular scan from an n-th time to an n+1-th time and electric wire vectors in a measurement system according to a comparative example of the fourth embodiment.
Figure 22:
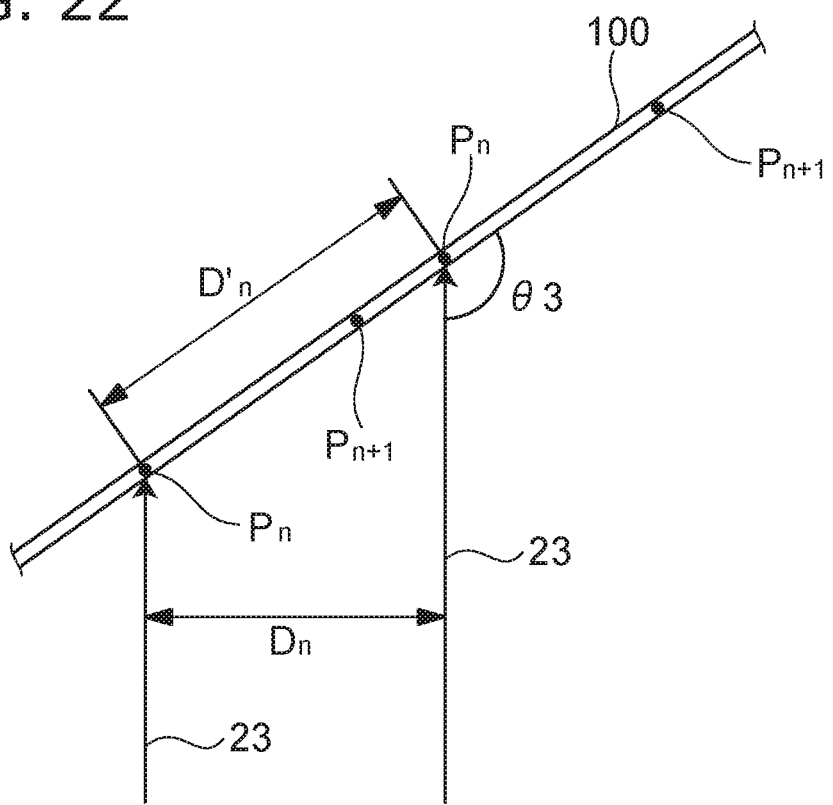
FIG. 22 is a diagram showing, from above, the electric wire shown in FIG. 21.

FIG. 21 is a diagram showing intersection points which are detected when performing a circular scan from an n-th time to an n+1-th time and electric wire vectors in a measurement system according to a comparative example of the present embodiment. FIG. 22 is a diagram showing, from above, the electric wire 100 shown in FIG. 21. In the comparative example shown in FIG. 21, the calculation control unit 19 controls a deflection operation of the deflecting unit 35 so that a scan in a circular shape is performed around a center position $C_n$ of a pair of intersection points $P_n$ by the measurement light 23.

In FIG. 22, the interval in the axis X direction of the pair of intersection points $P_n$ is equal to the diameter $D_n$ of the circular scan trajectory $T_n$ according to the first embodiment. On the other hand, the interval of the pair of intersection points $P_n$ on the electric wire 100 is $D'_n$ that is longer than $D_n$. Therefore, in the present comparative example, the interval of the pair of intersection points $P_n$ on the electric wire 100 does not equal the diameter $D_n$ and is wider than the diameter $D_n$. Accordingly, in the present comparative example, the calculation control unit 19 cannot make the intervals of the intersection points $P_n$ and $P_{n+1}$ on the electric wire 100 equal to those in the first embodiment. According to the measurement system of the present embodiment, since a length connecting the pair of intersection points $P_n$ is kept constant, coordinates of respective parts of the electric wire 100 can be acquired at constant intervals (scan density).

Embodiments of the present invention have been described above. However, it is to be understood that the present invention is not limited to the embodiments described above and various modifications can be made without departing from the scope of the appended claims. The configurations of the embodiments described above can be partially omitted or arbitrarily combined in manners that differ from those described above.

While an electric wire is described as an object to be measured in the description provided above, other modes may be adopted as long as the object to be measured is formed in at least any of a linear shape, a rod shape, and a columnar shape. For example, the object to be measured may be an H-beam used as building material or the like, a pipe, a utility pole, a column of a building, or the like. A width of the object to be measured is desirably equal to or less than one third of a length of the object to be measured.

While an operator selects both the search start point Pst and the search end point Pen of the electric wire 100 in the description provided above, other modes may be adopted. For example, the operator may select only the search start point Pst. In this case, instead of having the operator select the search end point Pen, the operator is desirably asked to select either one of leftward and rightward in the horizontal direction as a search direction. The search direction is used when determining a direction of an electric wire vector.

While the deflecting unit 35 is constituted by the pair of optical prisms 36a and 36b in the description provided above, other modes may be adopted. For example, a similar function to the pair of optical prisms 36a and 36b may be achieved using a two-axis galvanometer mirror.

While the calculation control unit 19 performs scans in a circular shape or an elliptical shape in the description provided above, a shape of a scan trajectory with the measurement light 23 is not limited to a circular shape or an elliptical shape and other modes may be adopted. For example, the calculation control unit 19 can perform a scan in a waveform shape such as a sinusoidal wave or a triangular wave along an object to be measured formed in at least any of a linear shape, a rod shape, and a columnar shape.

The invention claimed is:

1. A measurement apparatus, comprising:
a distance measuring unit having a light producing element configured to produce measurement light, a measurement light emitting unit configured to emit the measurement light, a light receiving unit configured to receive reflected measurement light, and a light receiving element configured to receive the reflected measurement light and generate a light reception signal, the distance measuring unit configured to perform a distance measurement of an object to be measured on the basis of the light reception signal from the light receiving element;
a deflecting unit configured to deflect a direction of emission of the measurement light relative to a reference optical axis and capable of performing a scan relative to a prescribed center in a circumferential direction with the measurement light; and
a control unit configured to control the distance measuring unit and the deflecting unit,
wherein the control unit is configured to detect coordinates of a pair of intersection points of the object to be measured that is formed in at least any of a linear shape, a rod shape, and a columnar shape and a scan trajectory with the measurement light on the basis of a distance measurement result by the distance measuring unit and the direction of emission deflected by the deflecting unit, and to control a deflection operation of the deflecting unit so as to change the direction of emission on the basis of the coordinates of the pair of intersection points such that the scan trajectory with the measurement light and the object to be measured intersect with each other.

2. The measurement apparatus according to claim 1, wherein the control unit changes the direction of emission such that a center of the coordinates of the pair of intersection points continuously moves either leftward or rightward in a horizontal direction.

3. The measurement apparatus according to claim 1, wherein the control unit changes the direction of emission such that the prescribed center is arranged on an extension of the coordinates of the pair of intersection points.

4. The measurement apparatus according to claim 3, wherein the control unit changes the direction of emission such that the scan trajectory with the measurement light prior to changing of the direction of emission and the scan trajectory with the measurement light after changing of the direction of emission overlap with each other.

5. The measurement apparatus according to claim 1, wherein the control unit is configured to change the direction of emission such that the prescribed center is arranged at either one of the pair of intersection points.

6. The measurement apparatus according to claim 1, wherein the control unit estimates a range of coordinates of the pair of intersection points detected after changing the direction of emission on the basis of the coordinates of the pair of intersection points, and to detect coordinates included in the estimated range as the coordinates of the pair of intersection points.

7. The measurement apparatus according to claim 1, wherein the control unit changes the direction of emission such that the scan trajectory with the measurement light has a circular shape and the circular shape has a size in accordance with a thickness of the object to be measured at a position where the object to be measured is arranged.

8. The measurement apparatus according to claim 1, wherein the control unit changes the direction of emission such that the scan trajectory with the measurement light has an elliptical shape with a minor axis in a direction connecting the pair of intersection points and the minor axis has a length in accordance with an inclination angle formed between a straight line connecting the pair of intersection points and the measurement light.

9. A control method of a measurement apparatus configured to perform a distance measurement of an object to be measured, the measurement apparatus including:
- a distance measuring unit having a light producing element configured to produce measurement light, a measurement light emitting unit configured to emit the measurement light, a light receiving unit configured to receive reflected measurement light, and a light receiving element configured to receive the reflected measurement light and generate a light reception signal; and
- a deflecting unit configured to deflect a direction of emission of the measurement light relative to a reference optical axis and capable of performing a scan relative to a prescribed center in a circumferential direction with the measurement light, the control method comprising the steps of:
- performing a distance measurement of the object to be measured on the basis of the light reception signal from the light receiving element;
- detecting coordinates of a pair of intersection points of the object to be measured that is formed in at least any of a linear shape, a rod shape, and a columnar shape and a scan trajectory with the measurement light on the basis of a distance measurement result of the step of performing a distance measurement and the direction of emission deflected by the deflecting unit; and
- controlling a deflection operation of the deflecting unit so as to change the direction of emission on the basis of the coordinates of the pair of intersection points such that the scan trajectory with the measurement light and the object to be measured intersect with each other.

* * * * *